May 29, 1934.   A. H. STOW   1,961,016
MINE CAR
Filed April 11, 1919    4 Sheets-Sheet 1

Inventor
A. H. Stow
by Hubert Peck Atty.

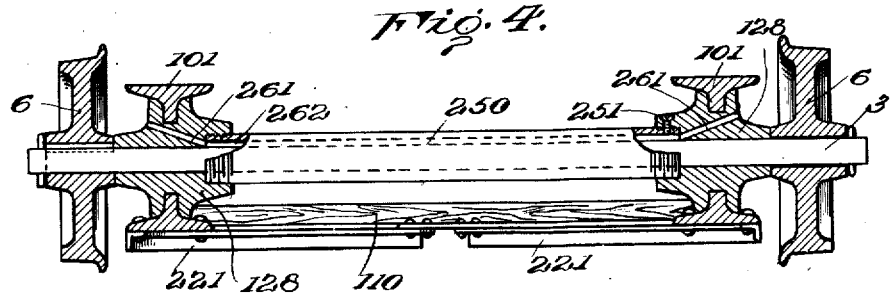
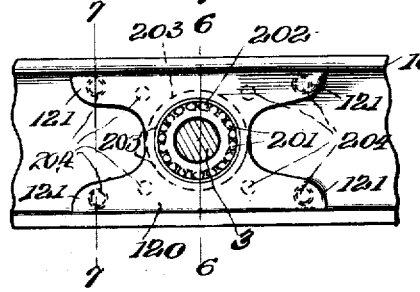
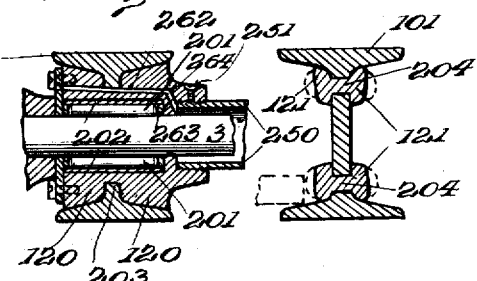
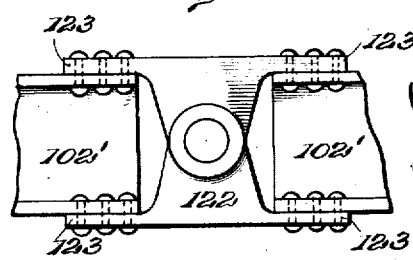
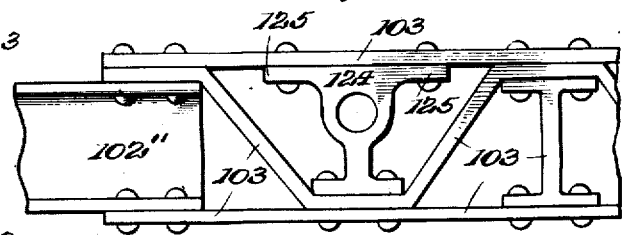
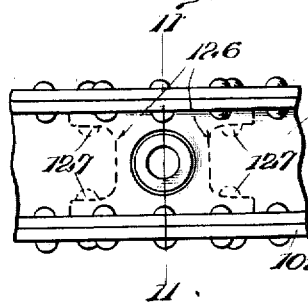
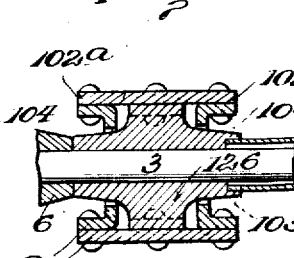
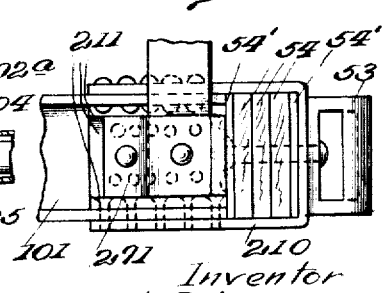

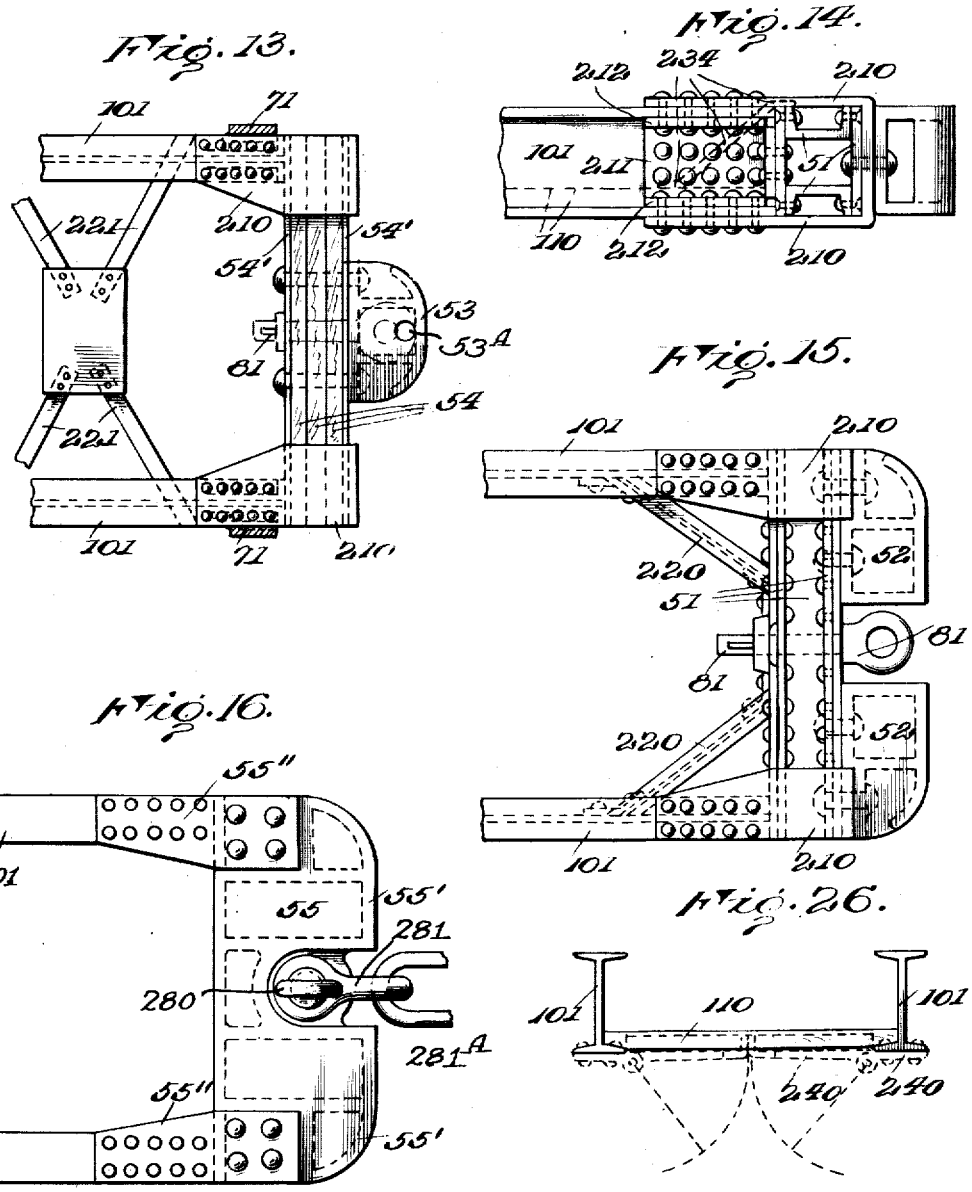

May 29, 1934.  A. H. STOW  1,961,016
MINE CAR
Filed April 11, 1919    4 Sheets-Sheet 4
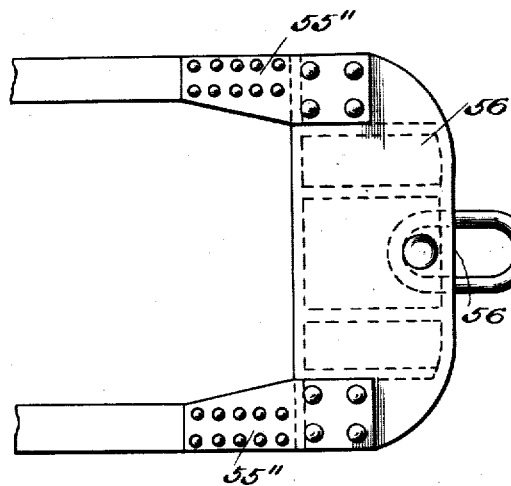
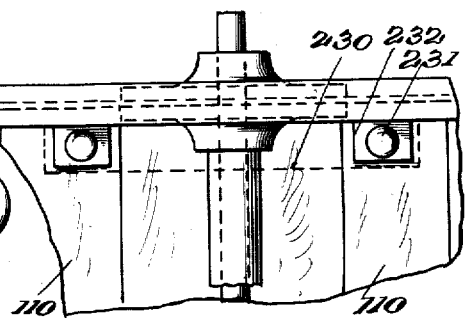
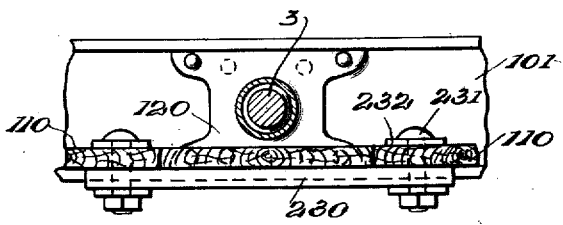
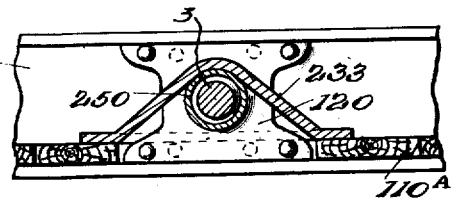
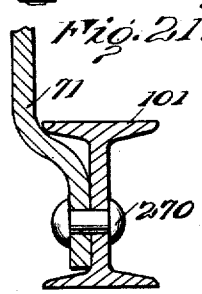
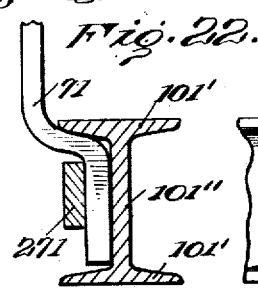
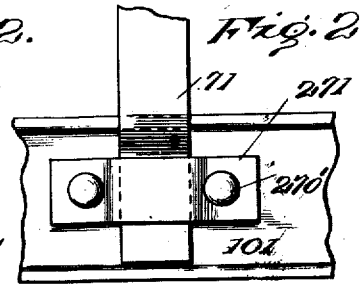
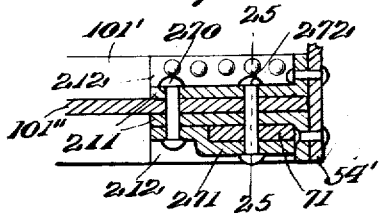
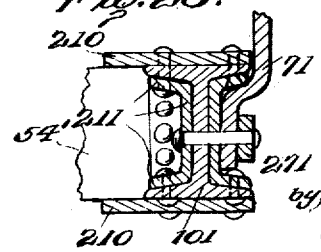

Patented May 29, 1934

1,961,016

UNITED STATES PATENT OFFICE

1,961,016

MINE CAR

Audley Hart Stow, Maybeury, W. Va., assignor, by mesne assignments, to Sanford Investment Company, Wilmington, Del., a corporation of Delaware Application April 11, 1919, Serial No. 289,190

209 Claims. (Cl. 105—364)

This invention relates to certain improvements in and relating to mine cars and the like; and the objects and nature of the invention will be readily understood by those skilled in the art in the light of the following explanation of the accompanying drawings illustrating what I now believe to be the preferred mechanical expressions or embodiments from among other forms, constructions and arrangements within the spirit and scope of the invention.

In mining practice, the longitudinal and transverse outside or "out to out" dimensions of mine cars are definitely limited, and it is an object of this invention to increase to the maximum the net lading capacity of such cars of definitely limited out to out dimensions while at the same time attaining the necessary durability.

A further object of the invention is to produce a wing type mine car that while retaining the efficiency of operation of the old cars of this type will also attain increased net loading capacity.

A further object of the invention is to provide certain improvements in features of construction, combination and arrangement, for the production of a highly advantageous mine or other car.

With these and other objects in view the invention consists in certain novel features in construction and in combinations and arrangements as more fully and particularly set forth and pointed out hereinafter.

Referring to the accompanying drawings:—

Fig. 4 is a detail cross section of the car frame or running gear, but showing plain or non-roller bearings for the axle;

Figs. 5, 6 and 7 are detail views of the axle boxing and parts of the side beams;

Figs. 8, 9, 10 and 11 are detail views showing plain or non-roller bearings for the axle and modified beam and boxing structures, Fig. 11 being a section of the structure of Fig. 10, taken transversely through the beam;

Fig. 12 is a detail side view of an end portion of the frame of the car of Figs. 1-3;

Fig. 13 is a detail top plan of said end portion of the car frame;

Fig. 14 is a detail side elevation of an end of the car frame showing a modification, and Fig. 15 is a detail top plan thereof;

Figs. 16 and 17 are detail top plan views of other modified forms of the car frame end constructions.

Figs. 18 and 19 are detail views showing means for supporting the floor planks that are located immediately under the axle tubes;

Fig. 20 is a detail view of a modified structure for closing the floor immediately below the axle tubes;

Figs. 21, 22 and 23 are detail views showing means that can be employed for securing the side standards to the car frame;

Fig. 24 is a detail horizontal longitudinal section through the end of a side beam of the car frame showing the manner of fastening one of the end side standards;

Fig. 25 is a detail vertical section taken on the line, 25—25, Fig. 24;

Fig. 26 is a detail diagrammatical view illustrating a pair of bottom dump doors.

Figure 1:
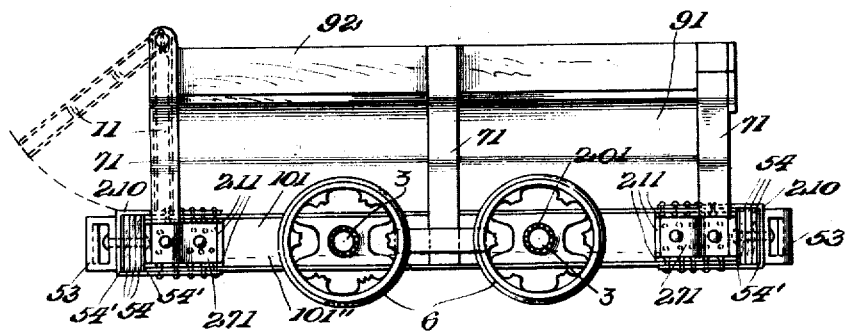
Fig. 1 is a side elevation of a car embodying my invention, portions being broken away to show the roller bearings for the axles.

What are usually termed "wing" type mine cars represent maximum efficiency of operation; but as heretofore designed, are not economical in the matter of net loading capacity for any given set of out to out dimensions. The wing type mine car, in end elevation, is wider at the top than at the bottom, and comprises the car bottom and the lower or inner vertical car sides located between the car wheels, and the wing bottoms with or without the outer upper or vertical wing sides. The lower vertical car sides are usually located as closely adjacent to the inner sides of the car wheels as will allow for working clearance and connect the outer longitudinal edges of the car bottom with the inner longitudinal edges of the wing bottoms.

Heretofore, mine cars usually provided a plank floor to carry the lading extending the entire length of the car. This floor was usually composed of three longitudinal planks, about three to four inches thick, arranged edge to edge, and projected beyond the car body ends to receive sheet iron or the like to form the end bumpers. This floor rested on the axle boxings that received the axles of the car wheels. Metal bars, termed belts or binders, arranged at the ends and intermediate portions of the car body, extended across the under side of the floor and upwardly at the exterior of the car body. The floor planks were bolted to these binders. The planks forming the sides of the body were also bolted to these binders. The ends of the body were fitted with suitable end gates or closures, and one of these gates was usually mounted to swing for dumping or unloading purposes. A single draw bar was usually provided extending throughout the length of the body and having eyes projecting at the opposite ends of the body to receive coupling devices. This draw bar usually rested on the center floor plank and was bolted to the binders.

The usual width of the floor or bottom of these old cars was, say, three feet, and the depth or thickness of the floor or planks, say, three inches. If the thickness of the bottom planks is increased, the amount of material necessary to build the car is increased, which necessarily increases the cost, as well as the dead weight of the car; and further, for a given off rail height of car, the net capacity of the car is decreased. If the bottom planks are not made thick enough the ends of the car, will in time, sag, thus causing wrecks due to telescoping. In order to prevent undue sagging of the ends, without increasing the thickness of the bottom planks, the wheels were sometimes placed further apart, thus increasing the wheel base. Increasing the wheel base, however, makes the cars harder running on curves, and also tends to increase the number of derailments.

A beam three feet wide and three inches in depth, is obviously most uneconomical in material; and yet, a beam three inches in depth but of a less width than three feet is fully capable of taking care of the compressive haulage strain, as is evidenced by the fact that the center bottom planks of said old structure are not utilized for that purpose.

The bottom planks served no useful purpose in taking care of the tensile haulage strain, a separate and distinct member, the draw-bar, having been provided for that purpose. Briefly then, the minimum thickness of the bottom planks that was necessary to carry the weight of the lading was more than necessary to take care of the compressive haulage strain, while for the tensile haulage strain, a separate and distinct member was provided, which however served no other useful purpose.

Roughly speaking, two beams four inches wide by eight inches in depth will carry substantially the same load, as a beam three feet wide, by three inches in depth.

Steel beams may be said to consist essentially of upper horizontal members, lower horizontal members, and vertical connecting members, a point in the vertical connecting member midway between the upper and lower members being in the horizontal neutral axis. A reduction in the amount of metal at or near the said neutral axis reduces the strength of the beam, relatively slightly, and may be readily compensated for by suitable reinforcing at that point.

In my invention, I take advantage of these facts, whatever the form of structural or stock beams I employ, and utilize a pair of such beams to form the side sills or longitudinal beams of the frame of my improved car. For instance, I use horizontal supporting beams, so designed and arranged that these supporting beams not only carry the load, but also at the same time take care of both the compressive and tensile haulage strains, usually approximately equal in amount, thereby gaining economy in material, while owing to the relative rigidity of steel beams, the wheel axles may be placed as close together as is otherwise desirable, thereby providing an easier running car.

In my improved car, I pass the car axles through the said horizontal supporting beams at, or as near their horizontal neutral axes as is otherwise desirable, the axle boxings being placed within said horizontal supporting beams, between the upper and lower members thereof, and attached to such portion or portions of said beams as may be most desirable for the service required; suitable reinforcements being provided to compensate for the reduction in strength of the beams due to the insertion of the axles and of the axle boxings. By this arrangement, I am enabled to support the car floor, by means of the said lower horizontal member of the beams, thus placing the bottom of the car below the car axles, instead of above the car axles, as in the old cars mentioned. I thus not only greatly increase the net capacity of the car, but also at the same time lower its center of gravity, and reduce the tendency to derailments, particularly on curves. Evidently the details may be largely varied to best suit the particular service required, in each instance.

The forms of structural steel beams used will be determined in each instance by supply and manufacturing as well as by mining conditions, although the I-beam, as clearly typical of structural steel beams, has been selected for purposes of explanation and illustration as well as because of its advantages. However, I do not wish to limit the broad features of my invention to the use of I-beams.

In structural steel work, it is the general practice, for the sake of economy in weight, to increase the vertical depth of the beam to carry increased load rather than to increase the weight of metal without change in depth. Owing to the position of the longitudinal side sills in my car, the depth of the sills can be increased up to the depth of the inner vertical car side walls, without loss in car capacity, to take care of increased load due to increased car length or to greater depth of car.

In what I now believe to be the preferred embodiment of my invention, I utilize two lengths of stock or common I-beams, 101, to form the side sills or longitudinal beams of the car frame. These beams are arranged vertically or on edge in parallelism, the lower horizontal flanges, 101', of these two beams being utilized to support the floor planks, 110. These planks are arranged transversely of the car with their ends resting on said bottom flanges and with their end edges tightly fitting, preferably tightly wedged, against the vertical connecting webs or members, 101'', of the beams. The axle boxings, 120, are preferably cast in, through and to the beams so as to be to all intents and purposes integral therewith. These boxings are extended to fit both side faces of the connecting members of the beams as well as the upper faces of the lower members or flanges and the bottom faces of the upper members or flanges, and thereby brace and reinforce the beams adjacent the holes or openings through the connecting members for the passage of the boxings and axles.

The rotary axles, 3, extend transversely of the car a distance above the car floor and are mounted in the boxings; suitable roller bearings, 201, being preferably provided in said boxings for said axles. The outer ends of the axles are provided with any suitable car wheels, 6. The side sills or beams are braced and rigidly connected by stiff axle tubes or housings, 250, surrounding the axles and at their ends rigidly secured to the inner ends of the axle boxings.

Instead of providing binders extending completely across the under side of the car, as in the old cars mentioned hereinbefore, I employ side standards, 71. The lower ends of these standards are arranged at the outer sides of the side sills and are suitably bolted thereto as hereinafter pointed out. The sides of the car body are suitably secured to these standards. I prefer to form these sides by sheet metal plates, 91, and wood planks, 92, the lower edges of the plates, 91, fitting down on the top members of the side sills, and the planks, 92, forming the top edge portions of the side walls. These top planks are subjected to excessive wear and can be readily renewed.

The car body can be provided with any suitable end walls or closures, 11, secured to the end standards, 71, although one of said walls preferably forms a swinging gate, as usual. The side sills are connected by end sills or cross beams to complete the approximately rectangular frame of the car, and to form or provide suitable end bumpers and means to receive the couplings connecting adjacent cars.

In my preferred form, the side sills are located closely adjacent to the inner faces of the car wheels, and extend in a right line approximately the length of the car body. The end sills are arranged outwardly beyond the ends of the car body and traverse and fit the end edges of the side sills and are rigidly secured thereto. The end sills, as will hereinafter be pointed out, are such as will be adapted to all clases of service, and yet at the same time of the minimum weight and cost consistent therewith.

Figure 3:
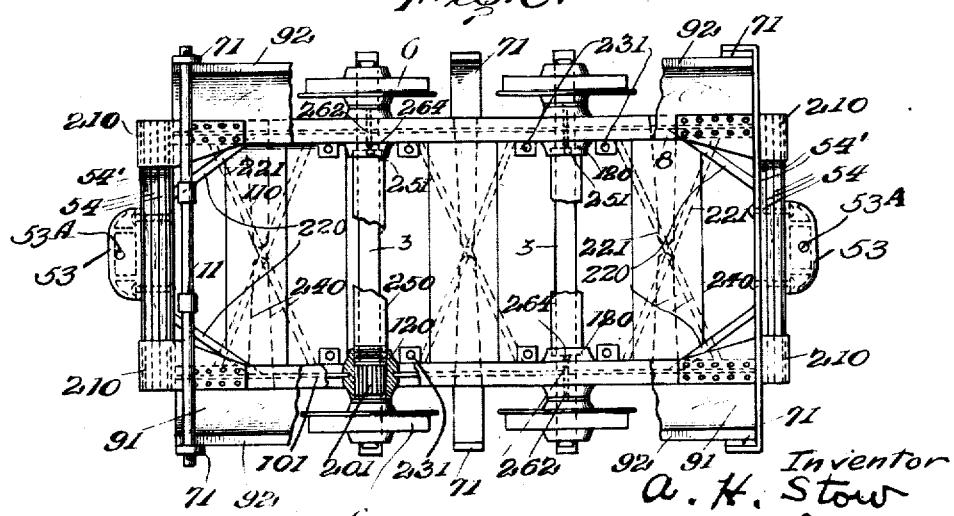
Fig. 3 shows the car in top plan, certain parts being broken away, and certain hidden parts being indicated by dotted lines.

What may be termed the flexible or cushioning end beam, suitable for ordinary service, is shown in Figs. 1, 3 and 12, and may be described as a cross bar composed of longitudinal parallel layers, 54, of wood and parallel facings formed by metal plates, 54'; the said cushioning end beam being rigidly secured and tied to the side sills by the metal stirrups, 210. Any suitable cast metal bumpers, 52 or 53, Figs. 13 and 15, are bolted to these cross bars and arranged at the outer sides thereof and formed to receive coupling pins and loops or other coupling devices.

With respect to the details of the axle boxings, I might explain that axle boxings are usually composed of cast iron. As cast iron contracts on cooling, it is possible to cast the axle boxings of my invention on and through the I-beams forming the side sills and thus avoid the labor of fitting and attaching by rivets while also gaining certain structural advantages. Usually in cast iron boxes, about one inch is the minimum thickness required for the circular wall of the boxing that surrounds the axle bearing, whether a plain or a roller bearing. Hence, in the structure of my invention, the hole in the connecting member of the I-beam for the passage of the portion of the boxing that surrounds the axle bearing, should be made as much larger in diameter than said bearing as may be required to produce said circular wall of the required radial thickness. This circular wall in the completed boxing will also serve to tie together the portions of the boxing at the opposite sides of the I-beam.

The roller bearing is preferable to the plain bearing even if bushed, and for that reason is shown in Figs. 5, 6 and 7; but of course, the roller bearing is not an essential feature of my improved mine car. The roller bearing boxing of course requires a larger hole in the I-beam than the plain boxing where the roller bearing extends through the beam as will be noted by a comparison of Figs. 4 and 6.

As shown in Figs. 5, 6 and 7, the axle boxing, 120, is designed for the use of a roller bearing, 201, of any of the usual types. Around the rollers themselves is shown the roller bushing, 202. In order to leave, say an inch of cast metal all around the roller bushing, the axle hole, 203, see dotted lines Fig. 5, in the I-beam 101, is necessarily much larger than for a plain boxing. This relatively large hole may be compensated for in several well known ways, as by the formation of the boxings to fit the flanges of the beams or by other reinforcements which can be bolted or riveted to the beams.

The axle boxing, 120, Fig. 5, has preferably vertical longitudinal extensions, 121, Figs. 5 and 7, at right angles to the axle, on either side of the I-beam, 101, and bearing tightly against the vertical member, as well as against both the upper and lower members. At suitable points where these longitudinal extensions are to bear against the vertical member of the I-beams, holes, 204, Figs. 5 and 7, are bored in the vertical member, before the boxing is cast in place, so that the molten metal, when the boxing is cast, may run through these holes thus uniting also the longitudinal extensions on either side of the vertical member with one another, as well as with said vertical member.

Evidently, the two portions of the axle boxing, 120, Figs. 5, 6 and 7, on either side of the I-beam, 101, can be cast in two separate parts, and each then united to the I-beam and to one another, as by rivets, thus forming the roller bearing axle boxing, substantially as heretofore explained. Evidently, also, the roller bearing, 201, Figs. 5 and 6, may be omitted, and a plain axle boxing, such as, 128, Fig. 4, or otherwise, might be employed.

Evidently, again, the longitudinal supporting beam, instead of being a continuous beam, from end to end, may be built up of several component parts, as in common practice, in other construction. As shown in Fig. 8, the sections of the I-beam, 102', may be united by means of the horizontal longitudinal extensions, 123, of the interposed plain cast axle boxing, 122.

Again, a similar form of plain axle boxing, 124, Fig. 9, having similar horizontal longitudinal extensions, 125, may thereby be riveted to a wrought iron truss, 103, uniting the sections of the I-beam, 102'', only one of which however is shown, as the other section of the I-beam is similarly united on the other side of the axle boxing, also not shown.

Where, however, long trips of cars are hauled at high speeds on heavy grades, by heavy haulage motors, I-beams of the usual weight and dimensions are preferably replaced by regularly built up beams, 102a, Figs. 10 and 11, in which case the axle boxing, 126, Fig. 11, see also dotted lines, 126, Fig. 10, is preferably cast separately and formed with horizontal longitudinal extensions; see dotted lines, 127, Fig. 10, by means of which it is say riveted to the upper and lower members of the said built up beam, 102a. The longitudinal supporting beam may also, of course, be made tubular in cross section and provided with attached bottom flange supports for the floor planks.

The built-up side sill, 102a, Fig. 11, shows a type of box girder wherein two vertical connecting members are formed by pressed channels. Fig. 14, shows structural channels forming the two horizontal members of the box girder end beam, 51.

Whatever the formation of the end sills and the means employed for fixing them to the ends of whatever construction of side sills there may be employed under my invention, the arrangements and constructions should be of such nature as to transmit the haulage strains, both tensile and compressive, to the side sills, and to withstand the haulage strains.

For ordinary purposes, I prefer the composite or built up end sill or bar hereinbefore described, which is more or less flexible and cushioning in action to reduce the shock of the haulage strains, as the wooden and metal strips or plates are arranged on edge with their wide flat vertical sides or faces engaging, thus forming a leaf spring, the action of which is in the line of the haulage strains. The strips or layers, 54, 54', are suitably bolted or clamped together.

The U-shape sheet metal stirrups, 210, pass around the ends of this built-up end bar and tightly clamp the inner vertical faces thereof against the end faces of the side sills or I-beams. The horizontal legs of the stirrups extend longitudinally along the top and bottom members of the respective I-beams and are strongly riveted to said members. The portions of the stirrup that pass around the built-up cross-bar are preferably of extended width, much wider than the horizontal width of the I-beams, with the legs of the stirrups reduced or tapered in width, whereby angle braces are formed at the corners between the I-beams and end cross-bars tending to stiffen the car frame against distortion.

Any suitable means or method can be employed for securing together the end beams and side sills as will best serve to transmit the haulage strains under various conditions, and hence I do not wish to limit my invention to the stirrups, 210.

Also, if so desired, channel or angle braces, 211, can be fitted to the side faces and flanges of the ends of the I-beams and secured thereto by transverse rivets and by the vertical rivets that secure the legs of the stirrups. These angle braces are also riveted to the inner metal plate, 54', of the end sill (Fig. 12). These angle braces, 211, will aid in preventing vertical distortion of the car frame ends, although ordinarily the vertical depth of the I-beams (usually about eight inches) and the bracing action of the stirrups should be sufficient for this purpose without the braces, 211.

Furthermore, I do not wish to limit all features of my invention, to any particular means for securing the end sills or cross beams to the side sills, nor to any particular end sill or cross beam construction or formation, nor to any particular frame or sill bracing arrangement.

Various end sill constructions can be employed. For the heaviest haulage service, relatively heavy end sills will be required. For instance, a hollow built-up all metal sill or beam, 51, may be employed, such as disclosed by Figs. 14 and 15, consisting of the usual channel bars riveted to flat plates or strips. These end sills rest against the ends of the side sills and can be secured by the stirrups, 210, as hereinbefore described and thus transmit the full compressive haulage strains directly to and against said side sills, as well as the tensile or tractive haulage strains through the medium of the stirrups. In this construction the angle or channel braces, 211, can be formed with end flanges fitting the inner side faces of the end sills, 51, and riveted thereto (Fig. 14).

Any suitable bumpers can be secured to the center or end portions of the end sills, 51, although I show end bumpers, 52, bolted thereto, and a center eye-bolt or bar, 81, to receive the coupling pin.

Again, an end cross-beam or sill, 55, (Fig. 16) might be formed by a single casting which includes or forms two side or end bumpers, 55', or as a single casting 56 forming a single bumper, 56', continuous across the center as shown by Fig. 17. These combination bumpers and end sills fit squarely against the ends of the side sills and are secured thereto by upper and lower riveted straps or stirrups, 55''.

A certain amount of cross bracing is desirable to prevent the rectangle, formed by the side and end sills, from being deformed under stress. As before described, the corner connections between the end and side sills perform certain bracing functions. Also, the axle tubes perform certain bracing functions. The bottom or floor planks, 110, also perform certain cross-bracing functions, inasmuch as they are laid transversely of the car with their ends abutting tightly against the vertical webs or connecting portions of the beams forming the side sills. The bottom thus serves the double purpose of carrying the lading and forming a cross brace.

However, I do not wish to limit all features of my invention to these matters of bracing.

Diagonal corner braces, 220 (Figs. 3 and 15) may be securely riveted or otherwise suitably attached to the side sills, 101, and to the box girder end sill, 51, as the said diagonal corner braces will add very materially to the strength of the said end sill, thus permitting a substantial reduction in the size, or weight, or both, of the said end sill, otherwise necessary for a given service. These diagonal corner braces are evidently well adapted to serve both as struts and ties, and as such, to transmit to the said side sills both the compressive and tensile or tractive haulage strains. The said diagonal corner braces may evidently be made of any suitable structural forms, such as I-beams, as shown, suitably united, for the purpose stated, to the said side sills and end sills. These diagonal corner braces may also be applied to the flexible bumper for the purpose of limiting the spring action of the center of the end sills, see Fig. 3.

The inside clear length of mine cars is commonly say, nine feet, so that struts serving also as tension members or ties should be provided, elsewhere than at the ends of the car, in order to keep the longitudinal supporting members or sills substantially parallel throughout their length, even under strain. This, evidently, may be readily and most simply and effectively accomplished by means of the axle tubes or housings, 250, surrounding the car axles, and suitably connected to the sills as by being attached to the axle boxings, 120, by any of the well known methods for this purpose. The axle tubes are shown attached by means of right and left handed threads, on opposite sides, which will require their insertion in the axle boxings before the cross end beams or sills are bolted in place. Once the axle tubes are screwed into the axle boxings, until the longitudinal supporting beams are exactly the distance apart desired, a screw, 251, will keep the axle tubes from turning in the corresponding threads within the axle boxings, thus maintaining the longitudinal supporting beams the desired distance apart. The tubular housings, 250, serve to keep coal or other lading from making contact with the axles. Such contact would cause grinding of the lading during the rotation of the axles.

In addition, the usual angle iron cross braces, ties or belts common for the purpose, see, 221, Figs. 3, 4, and 13, are preferably used. These cross braces are attached by rivets to the horizontal lower member of the longitudinal supporting beam 101. Usually three panels of cross bracing may be conveniently employed.

Usually, the car axles are say three inches in diameter, so that the axle tubes will be, say four inches in diameter, the length of the axle boxings, to which the axle tubes are rigidly attached, being say twelve inches, so that the combination of the axle tubes and attached axle boxings, forms a species of cross bracing, equal to a panel, say twelve inches wide by three feet in depth.

Where roller bearing axle boxes, such as, 120, are employed, the lower inner portions of the boxes so obstruct the portions of the lower inner edge flanges of the I-beam side sills immediately under the axle tubes, as to leave little room on said portions of the flanges to receive the ends of the floor planks. Various means can be employed to close the portion of the floor immediately under the axle tubes, under such conditions. Other means can be employed to support floor planks at these points, or means can be used as a substitute for floor planks to support the lading.

However, I do not wish to limit myself to such position of the roller bearing as will obstruct the application of the floor planks. For instance, in Figs. 3, 18 and 19, I show added or supplementary floor plank supports that are located immediately under the axle tubes. These supports are composed of metal bars, 230, arranged transversely of the under sides of the floor planks at both sides of the axle tubes and bridging the space immediately below said tubes and secured to said planks by bolts, 231. Planks can hence be placed on and bolted to bars, 230, and thus occupy the spaces in the floor immediately below said axle tubes.

If so desired, the plank flooring, 110A, Fig. 20, forming the lading bottom, may be omitted immediately below the axle tubes, 250, thus leaving openings through the lading bottom at these points. These sections of interrupted lading bottom thus formed will also be herein termed spaced-apart lading bottom portions, in order to distinguish from the continuous lading bottom, 110, Fig. 3, and may, evidently, also be described as being below the plane passing through the tops of the car wheel axles, 3, see also Fig. 1. The lading can be prevented from falling through such openings by sheet metal plates in the form of inverted V-shape troughs, 233, placed over the axle tubes, 250, and extending throughout the lengths thereof with their lower longitudinal edges resting on the plank flooring at each side of each tube.

As shown in Fig. 4, the duplex oiling ducts, 261, pass from the outer upper faces of the axle boxings, 123, through the axle boxings into the hollow cylindrical spaces, 262, between the car axle, 3, and axle tube, 250, so that lubricant inserted in either duplex oiling duct, will pass into said hollow cylindrical space, and from it to both the corresponding axle boxings, to which said axle tube may be attached. Evidently, the said hollow cylindrical space between the axle tubes and the car axles may be made large enough to store considerable lubricant, without unduly increasing the size of the axle tube.

The lower ends of the side standards, 71, fit the outer sides of the side sills and can rest on the bottom outer flange thereof and are secured to said sills in any suitable manner and by any suitable means. For instance, simple rivets, 270, (Fig. 21) can be employed, or straps, 271, secured by rivets, 270', (Figs. 22 and 23). Each side standard at the ends of the car body is preferably secured, as shown by Figs. 24 and 25, by a rivet, 272, passed through the standard and through the strap, 271, and through the braces or reinforcements, 211, and the connecting web of the sill.

Mine cars, however, are also sometimes emptied by providing swinging bottom dump doors which are allowed to swing open and downwardly, thus permitting the lading to drop immediately through the bottom of the car. My improved mine car is particularly well adapted to this form of dumping the load. Suitable gate hinges, 240, Fig. 26, may evidently be readily and suitably attached to the lower members of the longitudinal supporting beams as well as to the two bottom dump doors, thus allowing the two bottom dump doors, one attached to each longitudinal supporting beam, to swing downwardly and outwardly, as shown by the dotted lines, Fig. 26. Bottom dump doors which are hinged to the under sides of the axle tubes, and to the end sills, respectively, may of course, be used. I, however, do not claim bottom dump doors, as such.

Certain types of mine cars are emptied by tilting the car endwise, until it comes to rest, against a stop placed for the purpose, usually at an angle of say, 45, degrees to the horizontal. This type of dumping necessarily requires that one end of the car be opened or removed, during the process of dumping, the swinging end gate, 11, Fig. 1, being a common form, for the purpose stated. With the car standing tilted at an angle of say, 45, degrees, the inclined deflectors, 233, Fig. 20, will guide the lading over the axles, while the inclined deflector, 234, shown in dotted lines in Fig. 14, will guide the lading over the cross end beam, 51. The angle of the deflectors with the bottom of the car, may of course, be varied to suit the particular kind of coal to be handled.

My improved wing type mine car, may be described as consisting of a relatively light and flimsy lading holding body consisting mainly of the so-called wings or side walls, together with a strongly braced traction truck frame, suitably supporting the wing lading-holding body which is of such construction as to merely hold the lading suitably in place during transit. The said traction truck consists more particularly of longitudinal supporting side sills at least in part replacing the inner lower vertical sides of the old type mine car extending in a right line approximately the length of the car body so as to form a junction with suitable haulage strain-transmission end sills; the side sills and end sills forming a rectangular parallelogram frame; and the said end sills each bearing suitable bumper and draw-bar attachments; suitable axle boxings being attachments to the said side sills; suitable side sill bracing and axle covering attachments; together with a suitable side sill bracing lading holding bottom disposed below the car axles and supported by the lower portions of the side sills and end beams.

My improved traction truck, for use in mine and other cars, embodies a horizontal bridge truss, the side sills and end beams being suitably united, for the purpose; the axle tubes and the floor such as the tightly wedged bottom planks, serving as the struts, while the axle tubes also act as ties, together with such other ties and cross braces, as may be required for the haulage strains, straight line and diagonal, and for heavier service. The middle of the traction truck is thus left clear of middle beams.

In a number of mining districts, the wings or side walls of the mine cars are more usually made of oak plank 1½ inches thick, so that thin sheet metal wings or walls will increase the lading capacity of the car, to the extent of the difference between the respectve thicknesses of the plank and of the sheet metal, usually a gain of about ten per cent. Self-evidently, sheet metal car wings or walls cannot take care of any appreciable amount of haulage strains, much less wood plank car wings or walls for the fundamental reason that the car wings or walls are not in the line of the haulage strains. Therefore, increasing the thickness of the sheet metal wings or walls, over and above that necessary to suitably hold the lading in place, during transit, is an indisputable waste of metal, to the exact extent of any such increase. The side walls of the relatively light and flimsy lading holding body, above mentioned, may be regarded as parts of the sides of the car, each car side being an entity consisting of a light wall and the stronger longitudinal side member with which said wall is rigid and from which said wall rises, said side member being supported by the car axles. Therefore, each such car side may be defined as a continuous side having a horizontal continuous lower part of large mass or cross section and stability relative to other parts of said side and serving as a reinforcing member of said side.

My improved traction truck may be said to consist of the flanged metal side beams, 101, Figs. 3, 13, 14, 15 and 16, more particularly, in combination with different forms of end structures. The end structure, 55, Fig. 16, is a cast end beam, with integral bumper members. The hollow built-up all-metal end beam, 51, Figs. 14 and 15, is an end structure, composed of flanged metal beams with vertical flanges riveted to vertical sheet metal reinforcing straps, with attached bumper members. The composite built-up end sill, 54, 54', Figs. 3 and 13, is an end structure also having attached bumper members, which is also obviously, for reason previously given, a form of spring the object of which is to cushion the haulage impacts, and may therefore be termed a bumper spring, and also more specifically a transverse bumper spring, as being transverse of the car, the attached bumpers being therefore also herein termed spring cushioned bumpers.

The diagonal corner braces, 220, Fig. 15, will also be herein designated as corner members, as they serve to strengthen the corners of the traction truck formed by the side beams, 101, and the end structures, 51.

It is to be noted that the bumper member, 53, Fig. 13, also serves as a draw-head member. Compare with the cast end structure, 56, Fig. 17.

Figure 2:
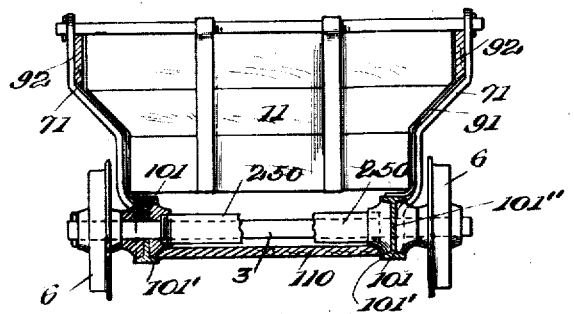
Fig. 2 shows the car in cross section, the axle tube being partially broken away.

The side standards, 71, Figs. 1, 2 and 3, for reasons previously explained, will also be herein termed lading-holding body-supporting members.

The lading siding or side walls, 91, 92, Fig. 2, which overhangs the supporting side beams, 101, in order to gain lading width, will also be herein termed overhanging lading siding. Somewhat similarly, the lading holding body, composed of the lading end closure, 11, and the lading siding, 91, 92, will also be herein termed an overhanging lading holding body.

My improved side sill, 101, Figs. 1 and 5, is herein also designated as a side beam, in order to indicate that the top and bottom flanges of the side beams are continuous and uninterrupted, at the car axles, 3, evidently the points of maximum strain. My side beam is also an improved side beam, for the further reason, that, as previously explained, it is reinforced at the points of maximum strain, by the attaching faces, 121, of the rotary axle journal boxing, 120. My improved side beam, therefore, will also be herein designated a reinforced side beam, and also, more specifically, as an axle boxing reinforced side beam. The side beam, 101, as above, is also herein so termed in order to distinguish from center thrust beams extending throughout the length of the car.

The coupling members shown in Fig. 16, consist of the coupling pin, 280, the clevis coupling, 281, and the plain coupling link, 281A.

The form of end structure shown in Figs. 14 and 15, is not specifically claimed herein for the reason that it is specifically claimed in my divisional case, Ser. No. 101,107, filed April 10, 1926.

For convenience in designating or describing the position of the lading floor or lading bottom relative to the axles or the journals which are supported by the car wheels, the term, "axle plane", is herein applied to the horizontal plane which cuts or is closely associated with said journals, the lading floor or a substantial part thereof being below that plane. In the particular form shown by the drawings, this "axle plane" cuts the side sills between the upper and the lower parts of said sills.

It is to be noted that the car floor or bottom is so supported and secured in the body of the car as to adapt it to remain in stationary or fixed position relative to the "axle plane" during operation of the car—during the loading and transporting and unloading of the car, the unloading being effected by tilting the entire car bodily and discharging the lading from the car by the action of gravity. Accordingly it is to be understood that, as used in the claims, "stationary floor" means a floor which is supported and secured and remains in position during operation or service as above described. Thus used, the term, "stationary floor" or "stationary bottom" excludes cars from which lading is discharged by gravity by displacing the floor relative to the axle plane.

Regarding the lading floor or bottom which lies entirely or in part below the horizontal "axle plane", the term, "sub-axle" floor or bottom is applicable and is so used in some of the following claims, that term being used to distinguish from the old type mine cars in which the lading bottom is above and extends across the axles. The deflectors which guide the lading over the axles and to or over the end structure are to be regarded as parts of the car floor or bottom.

Because the bracing or tying members, 221, (Figs. 3, 4 and 13) are below the "axle plane", it is appropriate to designate them as "sub-axle" cross-bracing members or as "sub-axle" ties. Furthermore, because those bracing members or ties are below the lading floor or bottom, they may also be termed "sub-floor" bracing members or ties.

Because the board or plank members, 110, and the "ties" or "bracing members", 221, are below the "axle plane" and because said floor and said ties are supported in relation to each other by the side sills, the portions of the "ties" or "braces" between the side sills forming supports for the floor, the members, 110, and said ties may be regarded as together constituting a "composite floor structure" and also as a "sub-axle composite floor structure".

In mine car practice, the ends of the car are provided with means for joining or connecting the car to other cars to form trains or "trips". This means for joining cars is ordinarily mentioned as "coupling" for the cars. In these cars provision is also made for taking impact or pressure when cars are driven or pressed against one another. Such means are ordinarily called "bumpers" or "bumper means". In this application several forms of means for performing these two functions are shown and described, the means for the two functions being in part combined structurally. To these means it is appropriate to apply the term, "bumper and coupling means"; and in some of the following claims that term is used with that meaning.

In mine cars of this general type, it is desirable to place the car axles sufficiently near each other to divide the length of the car into three parts, a middle part located between the axles and an end part reaching away from each axle, whereby the space between the wheels at each side of the car is relatively limited and makes what is termed a "short wheel base". For load distribution this positioning of the axles is desirable. Producing a "short wheel base" by this positioning is also desirable, because, as already herein stated, such a car having a short wheel base can better traverse short curves in such rail tracks as are ordinarily in service at mines. Furthermore, placing these axles to form a short wheel base, removes the wheels from the ends of the car where they will not interfere with the coupling and bumper means when cars are to be connected for operation as trains or "trips". By reference to the drawings, it will be seen that in my improved car the axles and wheels are placed as above described. And this placing of the axles may be defined as placing them in upright transverse planes which are between the upright transverse middle plane of the car and the ends of the car. It is also to be observed that an upright, transverse plane between either end of the car and the adjacent wheels, and near said wheels, will cut a part of the sub-axle lading floor or bottom lying below the axle plane. Hence it is appropriate to define these wheels and axles as being grouped between two upright, transverse planes cutting portions of the sub-axle lading floor lying below the axle plane.

It is to be observed that the boards or planks, 110, placed crosswise of the length of the car and resting by their ends against the side sills, 101, serve, along with the braces, 221 and 220, to retain the traction truck frame in rectangular form; but, since the boards or planks are individual pieces, although they meet edge to edge and form a continuous floor or bottom, the bottom thus formed is twistable and may, in unison with said frame, twist relative to a horizontal plane. Such twisting has functional value; for, if the rail track is uneven, said floor and frame can twist sufficiently to keep the four wheels of the car on the rails, while in the absence of such twisting, one of the wheels might be lifted above and free from the rail and allow the other wheel on the same axle to move away from its rail toward the companion rail and thereby derail the car and perhaps wreck that car and other cars in the trip or train of cars. Mention of stiffness or rigidity in other parts of this specification relates only to maintaining the rectangular form of the frame and is not concerned with preventing twisting of the frame relative to a horizontal plane.

I claim as my invention:

1. In a mine or similar car, wheel axles, sills having lower flanges, wing type side walls, a stationary sub-axle wooden floor supported by said sill flanges, and housings for the wheel axles.

2. In a self-clearing end dump mine car, wheel axles, a longitudinally extending wood flooring comprising the lowermost longitudinally extending horizontal member of the car, supporting sills for said flooring, and self-clearing housings over said axles and resting on the wood flooring.

3. In a self-clearing end dump mine car, wheel axles, a longitudinally extending wood flooring comprising the lowermost longitudinally extending horizontal member of the car, sills for supporting said flooring, axle housings mounted on said flooring and connected to said sills, and ties between the sills and located below the flooring.

4. In a self-clearing end dump mine car, wheel axles, a longitudinally extending wood flooring comprising the lowermost longitudinally extending horizontal member of the car, supporting sills for said flooring, wing type side walls carried by said sills, self-clearing housings over said axles and resting on the wood flooring, and ties connecting the sills.

5. In a self-clearing end dump mine car, wheel axles, side sills carried on said axles, a longitudinally extending wood flooring positioned below the wheel axles and comprising the lowermost longitudinally extending horizontal member of the car, said sills carrying said flooring, and ties between said sills.

6. In a self-clearing end dump mine car, wheel axles, a longitudinally extending wood flooring comprising the lowermost longitudinally extending horizontal member of the car, supporting sills for said flooring, self-clearing housings over said axles and resting on the wood flooring, and sub-axle ties between the sills and below the flooring.

7. In a car traction truck, the combination of side sills, cross end beams, a bumper deflector plate and axle deflector plates forming portions of the lading supporting floor fixed to said sills.

8. In an end-dump mine or similar rail car, the combination of side sills, cross end beams, axles, an end bumper, a sub-axle lading supporting floor including a bumper deflector plate and axle deflector plates.

9. In an end-dump mine or similar rail car, the combination of side beams, car wheel axles above the lower portions of the side beams, end structures, a stationary sub-axle lading bottom including inclined sheet metal axle deflector plates extending over the car axles.

10. In a mine or similar rail car which is to be bodily shifted to emptying position for dumping, the combination of side beams, car axles above the lower portions of the side beams, car wheels on said axles, stationary axle coverings, a stationary sub-axle lading bottom extending from side beam to side beam for bracing the same, and side walls supported by said side beams and extending upwardly for providing a substantially unobstructed lading space from which the lading may be discharged by bodily shifting the car to emptying position.

11. In a self-clearing end-dump mine car, the combination of body side members, end members, wheel axles supporting the side members, a stationary sub-axle floor occupying the space enclosed by the side members and the end members and said floor containing wood members laid side-by-side and self-clearing housings extending over the axles.

12. In a self-clearing end-dump mine car, the combination of body side members, end closures, wheel axles supporting the side members, a stationary sub-axle floor occupying the space enclosed by the side members and the end closures and said floor containing wood members laid transversely and side-by-side and self-clearing housings extending over the axles, and sub-floor ties between the side members.

13. In a self-clearing end-dump mine car, the combination of body side members, end members, wheel axles supporting the side members, a stationary sub-axle floor containing wood and self-clearing housings extending over the axles and filling the space enclosed by the side members and the end members.

14. In a self-clearing end dump mine car, the combination of body side members, end members, axles, and a stationary floor structure supported by the side members and having parts low relative to the axles and having other parts extending upward to form self-clearing axle housings.

15. In an end-dump mine or similar rail car, the combination of side beams, car axles supporting the side beams, an end structure, and a stationary sub-axle lading bottom having its forward part rising on a slope to join the upper part of said end structure.

16. In an end-dump mine or similar rail car, the combination of side beams, car axles supporting the side beams, two spaced-apart stationary sub-axle lading bottom portions and an axle deflector plate between said low lading bottom portions and extending approximately from side beam to side beam and rising on a slope from one of said lading bottom portions over a car axle and thence down again to meet the other lading bottom portion.

17. In an end-dump mine or similar rail car, the combination of side beams, car axles supporting the side beams, two spaced-apart stationary sub-axle lading bottom portions and an axle deflector plate between said lading bottom portions and rising on a slope from one of the bottom portions on up over a car axle and thence down again to meet the other lading bottom portion.

18. In an end-dump mine or similar rail car, the combination of side beams, car axles supporting the side beams, a stationary sub-axle lading bottom comprising two spaced-apart stationary sub-axle portions and an axle deflector plate between said bottom portions.

19. In a mine or similar rail car, the combination of longitudinal beams, car axles above the lower portions of the longitudinal beams, secured stationary sub-axle lading bottom members spaced apart below the axles, and stationary lading bottom members extending over the axles.

20. In a mine or similar end-dump rail car, the combination of longitudinal beams, car axles extending across the car above the lower portions of the longitudinal beams, frame end structures, a stationary sub-axle lading bottom structure comprising parts rising to guide lading over the axles and over one of the end structures, and a door at said end structure.

21. In an end-dump mine or similar rail car, the combination of side beams, end structures joining the side beams, car axles above the level of the lower portions of the side beams, a stationary sub-axle lading bottom structure supported by the side beams and comprisng an end part extending from side beam to side beam and rising to the height of the adjacent end structure.

22. In an end-dump mine rail car, the combination of wheels and axles, an end structure, a stationary sub-axle lading bottom structure rising by gradual slope to the height of the end structure.

23. In a mine or similar end-dump rail car, the combination of wheels and axles, an end sill, a door, and a stationary sub-axle lading bottom structure including an inclined end portion at said end sill whereby lading may be guided over the end sill when the car is in the end dumping position.

24. In an end-dump mine or similar rail car, the combination of wheels and axles, an end sill, an end door, and a stationary sub-axle lading floor structure including an end rising at a slope suitable for the discharge of lading over the end sill when the car is tilted for dumping.

25. In a mine or similar rail car, the combination of longitudinal beams, car axles above the lower portions of the longitudinal beams, and an approximately horizontal stationary sub-axle lading bottom supported by the longitudinal beams and comprising a part inclined to the length of the car.

26. In a mine or similar rail car, the combination of a lading body including two longitudinal beams each having an upright web, axle bearings seated in said webs and overlapping the outer faces of said webs and said bearings being extended inward through the adjacent webs and the overlapping part of each bearing being secured to the adjacent web, axles extending through said bearings, a sub-axle floor and axle deflector plates extending over the axles and over the extended parts of said bearings.

27. In a mine or similar rail car, the combination of side members, transverse axles in operative relation with said side members, axle tubes over said axles and in operative relation with said side members for supporting said tubes and for adapting said tubes to serve as braces between said side members, and a stationary sub-axle floor located between the side members.

28. In a mine or similar rail car, the combination of side members, axle bearings supported by said side members, axles in said bearings, axle tubes extending over the axles and secured to said axle bearings for supporting said tubes and to adapt said tubes to serve as bracing members between said side members, and a stationary sub-axle floor located between the side members.

29. In a mine or similar rail car, the combination of side members, axle bearings supported by said side members, axles in said bearings, axle tubes extending over the axles and screw-threaded to said axle bearings for supporting said tubes and to adapt said tubes to serve as bracing members between said side members, and a stationary sub-axle floor located between the side members.

30. In a mine or similar rail car, the combination of side members, axle bearings supported by said side members, axles in said bearings, axle tubes extending around the axles and secured to said axle bearings and communicating with said bearings for transmission of lubricant between said bearings and said tube, and a stationary sub-axle floor.

31. In an end-dump mine or similar rail car, the combination of side beams, car wheel axles above the lower portions of the side beams, end structures connecting the ends of the side beams, a stationary sub-axle lading bottom including a sheet metal deflector plate located adjacent one end structure and extending from side beam to side beam and obliquely upward to the height of said end structure.

32. In a self-clearing end-dump mine rail car, the combination of body side members and closures, wheel axles supporting the side members, a stationary sub-axle floor occupying the space enclosed by the side members and the end closures and including self-clearing housings extending over the axles, and sub-floor ties between the side members.

33. In a mine or similar end-dump rail car, the combination of an end sill, an end door, axle journals supported on lines which are horizontal and transverse to the length of the car and which journals are supported on the car body by means located above the level of the lower face of the lading bottom, a stationary sub-axle lading bottom in relation with the end sill for guiding lading over said sill when the car is tilted for dumping, the wheels and axles being grouped between upright transverse planes cutting parts of the lading bottom lying below the level of the axle planes, lading retaining walls, and bumper and coupling means at the ends of the car.

34. In a mine or similar end-dump rail car, the combination of a traction truck consisting of wheels and axle journals and strong side members and end members joining the side members, a stationary sub-axle lading bottom in relation with one of the end members for conducting lading over said end member when the car is tilted for dumping, a door at said end member, the wheels and axle journals being grouped between upright transverse planes cutting parts of the lading bottom lying below the axle plane, lading retaining walls supported by the traction truck, and bumper and coupling means at the ends of the car.

35. In a mine or similar end-dump rail car, the combination of a traction truck consisting of wheels and axles extending across the car and strong side members and end members joining the side members, a stationary sub-axle lading bottom in relation with the axles for conducting lading over the axles when the car is tilted for dumping, a door at one end of the car, the wheels and axle journals being grouped between upright transverse planes cutting parts of the lading bottom lying below the axle plane, lading retaining walls supported by the traction truck, and bumper and coupling means at the ends of the car.

36. In a mine or similar end-dump rail car, the combination of a traction truck consisting of wheels and axles extending across the car and strong side members and end members joining the side members, a stationary sub-axle lading bottom in relation with one of the end members and the axles for conducting lading over the axles and over said end member when the car is tilted for dumping, a door at said end member, the wheels and axles being grouped between upright transverse planes cutting parts of the lading bottom lying below the axle plane, lading retaining walls supported by the traction truck, and bumper and coupling means at the ends of the car.

37. In a mine or similar end-dump rail car, the combination of a traction truck consisting of wheels and axles extending across the car and strong side members and end members joining the side members, a stationary sub-axle lading bottom comprising parts extending over the axles for conducting lading over the axles when the car is tilted for dumping, a door at one end of the car, the wheels and axles being grouped between upright transverse planes cutting parts of the lading bottom lying below the axle plane, lading retaining walls supported by the traction truck, and bumper and coupling means at the ends of the car.

38. In a mine or similar end-dump rail car, the combination of a traction truck consisting of wheels and axles extending across the car and strong side members and end members joining the side members, a stationary sub-axle lading bottom comprising parts extending over the axles and a part rising at one of the end members for conducting lading over the axles and said end member when the car is tilted for dumping, a door at said end of the car, the wheels and axles being grouped between upright transverse planes cutting parts of the lading bottom lying below the axle plane, lading retaining walls supported by the traction truck, and bumper and coupling means at the ends of the car.

39. In an end-dump mine or similar rail car, the combination of longitudinal side members, wheels and axles supporting said side members, bumper and coupling means at the ends of the car, a stationary sub-axle lading bottom rising at one end to conduct lading over the adjacent bumper and coupling means and having its other end below the axle plane.

40. In a mine or similar rail car, the combination of side beams, car wheel axles above the lower portions of the side beams, end structures, and sub-axle cross bracing members secured to the lower portions of the side beams.

41. In a mine or similar rail car which is to be bodily shifted to emptying position for dumping, the combination of reinforced side beams, car wheel axles, a horizontal plane through the said axles intersecting the side beams above the lower portions of the same, a stationary lading bottom having the major portion of its lading supporting surface located below said plane and including elements extending from side beam to side beam, and end structures connected to said side beams and including bumper and coupling means extending above and below said plane, and side walls supported by said side beams and extending upwardly for providing a substantially unobstructed lading space from which the lading may be discharged by bodily shifting the car to emptying position.

42. In a mine or similar rail car, the combination of side members, car axles above the lower portions of the side members, and a composite stationary sub-axle lading floor structure comprising transverse metal members extending from side member to side member and secured to said side members and lading supporting flooring located above said metal members and having its rear part below the axle plane.

43. In a mine or similar rail car, the combination of side members, car axles above the lower portions of the side members, and a composite stationary sub-axle lading floor structure comprising transverse metal members extending from side member to side member and secured to said side members and lading supporting wood flooring located above said metal members.

44. In a mine or similar rail car, the combination of side members, wheels, car axles engaging said side members, and a composite stationary sub-axle floor structure engaging the side members and containing wood members lying side-by-side and metal ties.

45. In a mine or similar rail car, the combination of side members having inward turned lower flanges, car axles engaging said side members above said flanges, and a composite stationary sub-axle floor structure engaging the side members, said engagement including the supporting of the floor structure on said lower flanges.

46. In a mine or similar rail car, the combination of side members having their lower portions flanged, car axles above the lower flanges of the side members, and a composite stationary sub-axle floor structure comprising transverse metal members extending from side member to side member and secured to said lower flanges and wood flooring above said metal members and extending to the side members.

47. In a mine or similar rail car which is to be bodily shifted to emptying position for dumping, the combination of side members, car axles joining said side members and located in a plane intersecting said side members, end structures connecting the side members, and a composite stationary sub-axle floor structure comprising wood planking and transverse ties engaging the side members and bracing the same.

48. In a mine or similar rail car, the combination of side members having inward-turned lower flanges, car axles joined to said side members above said flanges, end structures connecting the side members, a composite stationary sub-axle floor structure engaging the side members, and means for securing at least parts of said composite floor structure together.

49. In a mine or similar rail car, the combination of a traction truck consisting of wheels and axles and strong longitudinal side members, axle tubes surrounding the axles and joined to the side members, and a stationary sub-axle lading bottom.

50. In a mine or similar rail car, the combination of a traction truck consisting of wheels and axles and strong longitudinal side members, axle boxings supported on said side members, axle tubes surrounding the axles, said tubes and said axle boxings being joined to one another and communicating with one another and one of said two members being provided with a lubricant inlet, and a stationary sub-axle lading bottom.

51. In a mine or similar rail car, the combination of a traction truck consisting of wheels and axles and side members having lower flanges and transverse members joining the side members, and a stationary sub-axle lading bottom comprising transverse members supported by said flanges.

52. In a mine or similar rail car, the combination of a traction truck consisting of wheels and axles and side members having lower flanges and transverse members joining the side members, and a stationary sub-axle lading bottom containing transverse wood members having their ends supported by said flanges.

53. In a mine or similar rail car, the combination of a traction truck consisting of wheels and axles and strong longitudinal side members and transverse members, a stationary sub-axle lading floor supported directly by the side members, and diagonal bracing means located below the lading floor and extending from side member to side member for bracing the same against separation.

54. In a mine car, the combination of wheel axles, sill plates having bottom flanges thereon below the wheel axles, a floor supported by said sill flanges, and axle housings mounted on said floor and between said sills, said housings having a gradual slope on one side thereof.

55. In a mine or similar rail car which is to be bodily shifted to emptying position for dumping, the combination of side beams and end structures, car wheel axles, a horizontal plane through the said axles intersecting the side beams above the lower portions of the same, means for securing together the side beams and end structures, a stationary sub-axle lading bottom including means located beneath the axles for bracing the side beams against relative movement in a horizontal plane, and further transversely extending means located adjacent the axles and extending above said bottom for bracing the side beams.

56. In a mine or similar rail car which is to be shifted bodily to emptying position for dumping, the combination of side beams and end structures, corner angles connecting the side beams and end structures, car axles located above the lower portions of the side beams, and a stationary sub-axle lading bottom, said bottom and side beams and end structures providing between them at least a part of a lading-receiving space which is substantially unobstructed and from which the lading may be discharged by bodily shifting the car to emptying position.

57. In a mine or similar rail car, the combination of wheels, axles supported by the wheels, a frame having sides supported by the axles, a sub-axle lading floor, said frame and said floor being yieldable to forces tending to twist said frame and said floor relative to a horizontal plane.

58. In a mine or similar rail car, the combination of wheels, axles supported by the wheels, a frame having sides supported by the axles, a sub-axle lading floor supported by the sides of the frame, said frame and said floor being yieldable to forces tending to twist said frame and said floor relative to a horizontal plane.

59. In a mine or similar rail car which is to be bodily shifted to emptying position for dumping, the combination of an approximately rectangular lading body including side beams and end structures including a bumper member, car axles above the lower portions of the side beams, car wheels on said axles, and a stationary sub-axle lading bottom extending from side beam to side beam for bracing the same, said lading body and bottom providing a substantially unobstructed lading space from which the lading may be discharged by bodily shifting the car to emptying position.

60. In a mine or similar rail car, the combination of side members, transverse axles in operative relation with said side members, coverings over said axles and in operative relation with said side members for supporting said coverings and for adapting said coverings to serve as braces between said side members, and a stationary sub-axle floor located between the side members and including additional means extending from side member to side member for bracing the same.

61. In a mine or similar rail car, the combination of longitudinal beams forming the car side sills, a stationary lading supporting floor carried by the lower portions of said sills, transverse axles arranged above said floor and supporting said beams, wheels supporting said axles, end closure means, and sloping side walls rising from the side beams.

62. In a mine or similar rail car, the combination of side members, end members comprising upright parallel metal plates and intermediate upright wood plates parallel to the metal plates, stirrups joining said end members to the side members, car axles supporting the side members, wheels supporting the axles and a stationary sub-axle bottom supported by the side members.

63. In a mine or similar open-top rail car, the combination of longitudinal side members, wheels and axles supporting said side members, bumper and coupling means at the ends of the car, a stationary sub-axle lading bottom rising at one end to conduct lading over the adjacent bumper and coupling means.

64. In a mine or similar open-top rail car, the combination of side members, car axles above the lower portions of the side members, and a composite stationary sub-axle lading floor structure comprising transverse metal members extending from side member to side member and secured to said side members and lading supporting flooring located above said metal members.

65. In a 4-wheel mine or similar rail car, the combination of a wing type body, longitudinal load-supporting side members, axle bearings between the wheels, axles in said bearings, axle coverings extending over said axles and secured to said axle bearings for supporting said axle coverings, and a central lading bottom made up of sections transverse to the length of the car body and a substantial part of the bottom sections being below the horizontal plane of the tops of the axle journals and cooperative with the side members for bracing the same.

66. In a 4-wheel mine or similar rail car, the combination of a wing type body, longitudinal load-supporting side members, axle bearings between the wheels, axles in said bearings, axle coverings extending over said axles and secured to said bearings for supporting said axle coverings and to adapt said axle coverings to serve as bracing members between said side members, and a central lading bottom made up of sections transverse to the length of the car body and a substantial part of the bottom sections being below the horizontal plane of the tops of the axle journals and cooperative with the side members for bracing the same.

67. In a 4-wheel mine or similar rail car, the combination of a wing type body, longitudinal load-supporting side members, axle bearings between the wheels, axles in said bearings, axle coverings extending over said axles and in operative relation with said side members for supporting said axle coverings, and a central lading bottom made up of sections transverse to the length of the car body and a substantial part of the bottom sections being below the horizontal plane of the tops of the axle journals and cooperative with the side members for bracing the same.

68. In a 4-wheel mine or similar rail car, the combination of a lading body, longitudinal load-supporting side members, axle bearings, axle in said bearings, stiff metal cross members a part of which at least is over and above the axles, and said metal cross members being in operative relation with said longitudinal side members for supporting said metal cross members, and a central lading bottom made up of sections transverse to the length of the lading body and a substantial part of the bottom sections being below the horizontal plane of the tops of the axle journals and cooperative with the side members for bracing the same.

69. In an end-dump or similar rail car, the combination of body side members, car axles above the lower edges of the body side members, a bumper structure at one end of the car, and a stationary sub-axle lading bottom having its forward part rising on a slope to a height sufficient to pass the lading over the top of said bumper structure when the car is tilted forward for dumping.

70. In an end-dump mine rail car, the combination of wheels and axles, a bumper structure, a stationary sub-axle lading bottom structure rising by gradual slope to the height of the bumper structure.

71. In mine and similar rail cars, the combination of stiff load-supporting side members each comprising an upright section and sidewise extending top and bottom stiffening sections, end traction structures rigid in respect of the side members, bumper and coupling means, car axle journals which lie in a plane cutting the upright sections of the side members, a non-rotatable lading bottom stationary in respect of the side members and having at least its lower portions below the horizontal plane of the axle journals and cooperative with the side members for bracing the same, and end and side lading retaining walls.

72. In mine and similar rail cars, the combination of longitudinal structural metal supporting side members each comprising an upright section and a sidewise extending stiffening section, end sill structures rigid in respect of the longitudinal side members and including end sill haulage strain cushioning means, wheeled axle spindles supporting the said side members, and a non-rotatable lading bottom stationary in respect of the side members and having at least its lower portions below the horizontal plane of the tops of the axle spindles, and also below the upper portions of the upright sections of the side members.

73. In mine and similar rail cars, the combination of longitudinal metal side stiffening and supporting sills having a substantially upright web and top and bottom members projecting to the sides of the upright web, end traction structures rigid in respect of the side sills so as to form a traction truck frame, wheeled car axle spindles intermediate the top and bottom members of the side sills, a draw head and bumper and coupling members secured to the end traction structures, together with a non-rotatable central lading bottom stationary in respect of the side sills and with at least its lower portions lying below the horizontal plane of the tops of the axle spindles.

74. In self-clearing end-dump mine and similar rail cars, the combination of longitudinal metal side load-supporting sill-members having substantially upright sections, end bumper and haulage structures rigid in respect of the side sill-members, wheeled axle spindles lying in a plane that cuts the upright sections of the side sill-members, a stationary lading bottom with at least its lower portions below the horizontal plane of the tops of the axle spindles, together with a secured inclined deflector plate for the forward dumping and haulage structure whereby the lading may be discharged over it when the car is tilted in the end-dumping position.

75. In a self-clearing end-dumping mine or similar rail car, the combination of wheels, axle journals, bumping and haulage end structures, a stationary low-level lading floor with portions of its bottom lying below the horizontal plane of the centers of the axle journals, a lading body, a lading body end gate movable for the discharge of lading out the forward end, and suitable deflector plates whereby substantially all the lading will pass from the low-level lading bottom through the forward gate opening and over the forward bumper and haulage end structure when the car is tilted forward for end-dumping.

76. In a self-clearing end-dumping mine or other rail car, the combination of wheeled axle spindles, bumper and coupling means, a car lading-body structure stiffened against endwise drooping, a stationary central lading bottom at least substantial portions of which lie below the plane of the tops of the axle spindles, together with secured deflector plates whereby the lading is deflected for substantially complete discharge out of the forward end of the car when the car is tilted forward for end dumping.

77. In mine and similar rail cars, the combination of load-supporting longitudinal side members, wheeled axle journals having bottoms lying in a plane cutting the side members, car wheels outside at least parts of the side members, lading retaining sides, lading body end-closures, bumper and coupling means, a central lading bottom with at least its lower portions below the horizontal plane of the tops of the axle journals, axles supporting the car body on bearings lying at least in part between the longitudinal side members, together with transverse axle protective coverings above the car axles.

78. In a mine or similar rail car, the combination of wheeled axle spindles, traction haulage and bumping means, a lading body frame stiffened against endwise drooping, a stationary central lading body having at least its lower portions below the horizontal plane of the tops of the axle spindles, axle journal boxings inside the wheels with inwardly projecting extensions, transverse metal axle coverings connecting oppositely disposed boxings and serving also as stiffening means.

79. In mine and similar rail cars, the combination of car axles, wheels, bumper and coupling means, longitudinal metal side load-supporting members with substantially upright and straight sections inside the wheels, the said longitudinal members being reinforced adjacent the car axles by transverse metal stiffening members, together with a stationary central lading bottom with at least substantial portions below the plane of the tops of the car axle journals, and below the top portions of the longitudinal side members and cooperative with said longitudinal members for bracing the same.

80. In a 4-wheel mine or similar rail car, the combination of wheels, bumper and coupling means, metal longitudinal load-supporting members with upright webs passing substantially from end to end of the lading body of the car and located at least in part between the wheels, the said load-supporting members serving at least in part as lading closing walls, the car axles having rotatable wearing journals, and the centers of the wearing journals lying in a plane cutting the upright webs of the longitudinal members, lading body end closures, together with a stationary central lading bottom lying at least in substantial part below the plane of the tops of the car axle journals and cooperative with said longitudinal members for bracing the same.

81. In a 4-wheel mine or similar rail car, the combination of car wheels, bumper and coupling means, load-supporting side members having upright walls located between the wheels, wing type lading bodies, car axle journals having portions below the plane of the tops of the said upright walls of the said side members, together with a stationary and approximately horizontal lading bottom between the upright walls of the side members with at least its lower portions below the horizontal plane of the tops of the car axle journals and cooperative with said side members for bracing the same.

82. In a 4-wheel mine or similar rail car, the combination of car axle journals, car wheels, longitudinal metal load-supporting side members parts of which lie inside the upright longitudinal plane of the insides of the flanges of the car wheels, a stiff end bumper and haulage means rigid in respect of the side members, car axle journals lying in a plane cutting the side members, together with a stationary central lading bottom at least in substantial part below the plane of the tops of the car axle journals and cooperative with said side members for bracing the same.

83. In mine and other rail cars, the combination of longitudinal load-supporting metal members with upright webs, the said metal members acting at least in part as lading body closure walls, car wheel axle journals lying in planes cutting the metal members, coverings for the axles between the metal members, bumper and coupling means, together with a non-rotatable stationary lading bottom lying at least in substantial part below the plane of the tops of the axle journals and cooperative with said longitudinal members for bracing the same.

84. In mine and similar rail cars, in combination, a lading body, a front end gate adapted to open for the discharge of lading when the car is tilted forward, end bumper members, end draw bar members, axle journals, wheels on said axle journals, a stationary lading bottom at least the lowest portions of which lie below the horizontal plane of the top of the axle journals, deflecting means associated with the lading bottom and adapted to facilitate the movement of the lading over the forward end bumper when the car is tilted forward for end-dumping.

85. In mine and similar rail cars, the combination of end bumper structures, wheeled axle spindles, a stationary bottom structure lying at least in part below the plane of the centers of the said axle spindles, and other parts of the bottom structure rising in deflector form over one of the said end bumper structures.

86. In a mine or similar rail car, the combination of a body structure including end walls and side walls, the said side walls having substantially upright sections at their lower portions, axles supporting the side walls, and the plane of the journals of the said axles cutting the upright sections of the side walls, bumper and coupling means, and a stationary central bottom structure with at least substantial parts lying below the plane of the top of the axle journals, the said bottom structure being so suspended that the said body structure is given freedom for flexing and twisting.

87. In a mine or similar rail car, the combination of car wheels, bumper and coupling means, side sills with substantially upright sections inside the said car wheels, transverse end sills rigid with the side sills so as to form a flexible frame of sufficient strength to resist downward load strains and end thrust and longitudinal strains, axles the centers of whose journals lie in a plane cutting the upright section of the side sills, a central stationary lading floor having its lower portions below the level of the horizontal plane of the tops of the axles, the said lading floor having edges supported by the side sills, and the said floor being strong enough to support the material put into the car and being devoid of such rigidity and form as will substantially resist twisting of said frame.

88. In a mine or similar rail car, the combination of wheels and axles, a traction truck frame including end members, and side members inside the wheels, the said side members being supported by the axles, and having substantially upright longitudinal walls and stiffening flange-sections, bumper and draw bar means attached to the end members, and a stationary central non-rotatable lading bottom supported directly by the traction truck frame and having at least substantial portions lower than the plane of the tops of the car axle journals and also lower than the plane of the upper portions of the upright walls of the side members and cooperative with said frame for bracing the same.

89. In a mine or similar rail car, the combination of wheels, axles, a traction truck frame comprising side sills supported and penetrated by the axles, end bump-resisting transverse members, bumper and draw bar means attached to the end members, transverse members intermediate the end members, a stationary central lading bottom at least in part supported directly by a transverse member and having at least a substantial portion of its bottom surface lower than the plane of the tops of the axle journals.

90. In a mine or similar rail car, the combination of wheels, longitudinal load-carrying metal members at least in part between the wheels and with substantially upright wall-sections, car axles the centers of whose journals lie in a horizontal plane cutting the upright wall-sections, a securely fastened and suitably supported non-rotatable car bottom bracing the longitudinal members and lying between the wheels and at least substantial portions of the lower surface of said car bottom lying below the horizontal plane of the tops of the axle journals, and also below the tops of the said upright wall-sections of the longitudinal members, together with a metal bumping member having a substantially upright bumping face and the lower portions of the said bumping face being below the horizontal plane of the tops of the journals of the car axles.

91. In mine or similar rail cars, wheeled axle spindles, a lading bottom with at least substantial portions lying below the horizontal plane of the tops of the axle spindles, longitudinal metal load-supporting members serving as sides of a traction truck frame and integral transverse cast-metal end bumping members in secured relationship with the ends of the said longitudinal members whereby the said end members serve at least in major part as the end stiffening means of the traction truck frame.

92. In mine or similar rail cars, wheeled axle spindles, a lading bottom with at least substantial portions lying below the horizontal plane of the tops of the axle spindles, longitudinal metal load-supporting members serving as sides of a traction truck frame, and integral transverse cast-metal end bumping and haulage members in secured relationship with the ends of the said longitudinal members whereby the said end members serve at least in major part as the end stiffening means of the traction truck frame.

93. In a dumping 4-wheel mine or similar rail car, the combination of wheeled axle journals, bumper and coupling means, a substantially rectangular traction truck frame consisting of longitudinal metal side members and transverse end members joining the side members, flanged plate metal members having a substantially horizontal section extending over at least a part of the top of a transverse end member and having also a substantially vertical section extending over at least a part of the outside vertical face of a transverse end member adjacent the end of said transverse end member, and a central lading bottom lying in substantial part below the horizontal plane of the tops of the axle journals.

94. In a dumping 4-wheel mine or similar rail car, the combination of wheeled axle journals, bumper and coupling means, a substantially rectangular traction truck frame consisting of longitudinal metal side members and transverse end members joining the side members, a plate metal member consisting of a vertical section and upper and lower horizontal flanges, said plate metal member being mounted on a transverse end member of the traction truck frame adjacent an end of said transverse end member, the vertical section of said plate metal member extending across the outer vertical face of said transverse end member and the upper horizontal flange of said plate metal member extending across at least a part of the upper horizontal surface of the transverse end member and the lower horizontal flange of said plate metal member extending across at least a part of the lower horizontal surface of the transverse end member, and a central lading bottom lying in substantial part below the plane of the tops of the axle journals.

95. In a dumping 4-wheel mine or similar rail car, the combination of wheeled axle journals, bumper and coupling means, a substantially rectangular traction truck frame consisting of longitudinal metal side members and transverse end members joining the side members, a central stationary lading bottom lying in substantial part below the horizontal plane of the tops of the axle journals, plate metal corner bracing and stiffening members having a substantially horizontal section, said corner bracing and stiffening members being in rigid relationship with both a longitudinal side member and an end transverse member and the said bracing and stiffening members cutting the upright planes of the inside of the traction truck frame.

96. In a dumping 4-wheel mine or similar rail car, the combination of wheeled axle journals, bumper and coupling means, a substantially rectangular traction truck frame consisting of longitudinal metal side members and transverse end members joining the side members, a central stationary lading bottom lying in substantial part below the horizontal plane of the tops of the axle journals, metal diagonal corner bracing and stiffening members secured to both a longitudinal side member and a transverse end member, and said corner bracing and stiffening members crossing a part of the area enclosed by the upright planes of the inside of the traction truck frame.

97. In a mine or similar rail car, the combination of axles having journals, a stationary longitudinally extending central wood floor of rectangular perimeter with portions of the bottom surface thereof located below the horizontal plane of the tops of the axle journals, longitudinal side members for supporting said floor and themselves supported on said axles and extending above and below the axes of said journals, and wing-type side walls sealed with said central floor.

98. In an end dump mine or similar rail car, the combination of transverse end bumper structures, substantially straight load-supporting side sill-members extending from one end bumper structure to the other and in rigid relationship therewith, axles having journals, and a stationary floor structure having the first part located below the horizontal plane of the tops of the axle journals and below the top of one of said bumper structures, and another part extending upward from said first part to the top of said one bumper structure whereby the lading is guided over the said end bumper structure when the car is tilted for end dumping.

99. In a mine or similar rail car, the combination of side members having substantially straight and upright wall-sections, end bumper structures in rigid relationship with the ends of the upright wall-sections of the side members and forming therewith a rectangular traction truck frame, side lading closure walls whose lower portions terminate at and are joined with the upper parts of said upright wall-sections, whereby the side beams serve as a part of the lading enclosure, car axles for supporting the side members and having journals located in a horizontal plane intersecting the end bumper structures, a car floor including a stationary portion located between the upright planes of the axle journals and below the level of the axle journals, and axle coverings extending above the axles.

100. In a mine or similar rail car, the combination of side members having substantially straight and upright wall-sections, end bumper structures in rigid relationship with said upright wall-sections and forming therewith a rectangular traction truck frame, car axles for supporting the side members and having journals located in a horizontal plane intersecting the said end bumper structures, and a stationary car floor including a portion located between the upright planes of the axle journals and below the horizontal plane of the centers of the axle journals for bracing said side members.

101. In a mine or similar rail car, the combination of side sill-members, end bumper structures for connecting the ends of the side members and forming therewith a rigid rectangular traction truck frame, car axle journals located in a horizontal plane penetrating the side members, a stationary lading floor comprising a plurality of sections located below the level of the horizontal plane of the axle journals for bracing said side members, and axle coverings extending over the axles.

102. In a mine or similar rail car, the combination of wheels, car axles having journals, end bumper structures, longitudinal side sill-members with substantially upright wall-sections extending straight from one end bumper structure to the other, the horizontal plane of the centers of said axle journals intersecting said wall-sections, end closures, a stationary sub-axle lading floor located in the space enclosed by the side sill-members and the end closures and extending from sill-member to sill-member for bracing the same, the wheels and axle journals being grouped between upright transverse planes intersecting low parts of the lading floor, and stationary cover members extending over the bodies of said axles.

103. In a mine or similar rail car, the combination of transverse end bumper structures including spring means for cushioning the strains of haulage, car axles having journals located in a horizontal plane intersecting the end bumper structures, substantially straight longitudinal side sill-members, the horizontal plane of the axle journals intersecting said sill-members, and a sub-axle lading bottom extending from side member to side member for bracing the same.

104. In a mine or similar rail car, the combination of transverse end bumper structures, longitudinal side sill-members in rigid relationship with the bumper structures and forming there with a rectangular traction truck frame, car axles having journals whose centers are located in a horizontal plane intersecting the bumper structures and the side sill-members, axle boxings attached to the side sill-members, and a stationary lading bottom located at least in part below the horizontal plane of the tops of the axle journals and in bracing relationship to said side-sill members.

105. In a mine or similar rail car, the combination of transverse end bumper structures, straight longitudinal side sill-members extending from one bumper structure to the other and having substantially upright lower wall-sections in rigid relationship with the bumper structures, car axles having journals whose centers are located in a horizontal plane intersecting the bumper structures and located above the lower portions of the side sill-members, and a stationary sub-axle lading bottom structure extending continuously from side sill-member to side sill-member and from end bumper structure to end bumper structure in bracing relationship therewith.

106. In a mine or similar rail car, the combination of transverse end bumper structures, straight and rigid longitudinal side sill-members extending from one bumper structure to the other and in secured relationship with the bumper structures and forming therewith a traction truck frame, car axles having journals whose centers are located in a horizontal plane intersecting the said bumper structures, and a stationary sub-axle lading bottom structure extending substantially horizontally from side sill-member to side sill-member and from end bumper structure to end bumper structure in bracing relationship therewith.

107. In a mine or similar rail car, the combination of transverse end bumper structures, straight load-supporting side members with lower stiffening sidewise-extending sections that run substantially continuously from one bumper structure to another, car axles for supporting said side members and having journals whose tops are located in a horizontal plane intersecting the side members, and a stationary sub-axle lading bottom structure extending from side member to side member and supported directly by the lower stiffening sections of the side members.

108. In a mine or similar rail car, the combination of a lading body, straight load-supporting side sill-members extending from end to end of the lading body, car axles having their journals located in a horizontal plane intersecting the side sill-members near their lower edges, said lading body including a stationary sub-axle lading bottom structure extending from sill-member to sill-member for bracing the same, the wheels and axle journals being grouped between transverse upright planes intersecting said sub-axle lading bottom structure below the horizontal plane of the centers of the axle journals.

109. In a mine or similar rail car, the combination of a traction truck consisting of car wheels, car axles having journals, end bumper structures, and strong longitudinal side members, said axle journals being located in a horizontal plane intersecting the side members, axle tubes surrounding the axles, and a stationary sub-axle lading bottom structure extending from one bumper structure to the other.

110. In a mine or similar rail car, the combination of a traction truck consisting of transverse end bumper structures, wheels, car axles having journals, and straight longitudinal side sill-members in rigid relationship with the transverse end bumper structures and forming therewith a traction truck frame, axle boxings secured to said side sill-members, axle coverings over the axles and joined directly to the axle boxings, and a sub-axle lading bottom structure.

111. In a mine or similar rail car, the combination of a traction truck consisting of wheels, car axles having journals, longitudinal side sill-members extending straight from end to end and intersected by the horizontal plane of the bottoms of said journals, a stationary sub-axle lading bottom structure of substantially rectangular perimeter extending substantially in a horizontal plane from one sill-member to another in bracing relationship therewith, and transverse members joining the sill-members above said horizontal plane.

112. In a mine or similar rail car, the combination of a traction truck consisting of straight longitudinal side sill-members, transverse end members secured to the side sill-members, wheels, car axles extending through the side sill-members, and a stationary sub-axle lading bottom structure extending from one transverse end member to the other and from one sill-member to another in bracing relationship therewith.

113. In a mine or similar rail car, the combination of a traction truck consisting of straight longitudinal side sill-members having substantially upright lower wall-sections, wheels, car axles having journals whose centers are located in a horizontal plane intersecting the side sill-members, a stationary sub-axle lading bottom structure, and cross braces extending below said bottom structure.

114. In a mine or similar rail car, the combination of a traction truck consisting of wheels, car axles, straight longitudinal side sill-members located inside said wheels, transverse end members, corner members for connecting the sill-members and end members, and a stationary sub-axle lading bottom structure of substantially rectangular perimeter extending from side sill-member to side sill-member.

115. In a mine or similar rail car, the combination of transverse end bumper structures, straight load-supporting side members each having a horizontal continuous lower portion extending from one bumper structure to the other and of large mass and cross-section and stability relative to other portions of said side and operating as a longitudinal reinforcing means for said side, axles penetrating said sides, and a stationary lading floor extending from side member to side member and bracing the same and including a portion located between one end and the adjacent axle and located below the plane of said axles.

116. In a mine or similar rail car which is to be bodily shifted to emptying position for dumping, the combination of straight side sill-members, car axles having journals located in a horizontal plane above the lower portions of the side sill-members, end sill-structures including bumper means, means for securing together the side sill-members and the end sill-structures, a stationary lading bottom having at least portions which are located below the horizontal plane of the centers of said journals and extending from sill-member to sill-member and closure walls providing with said bottom and said sill-members and sill structures a substantially unobstructed lading space from which the lading may be discharged by bodily shifting the car to emptying position.

117. In a mine or similar rail car which is to be bodily shifted to emptying position for dumping, the combination of straight longitudinal side sill-members, car axles having journals located in a horizontal plane above the lower portions of the side sill-members, end sill-structures including bumper means located substantially in horizontal alinement with said side sill-members and extending above and below said horizontal plane, corner angles for connecting the side sill-members and the end sill-structures, and a stationary lading bottom having at least portions which are located below the horizontal plane of the centers of said journals.

118. In a mine or similar rail car, the combination of load-supporting longitudinal side sill-members, car axles having journals whose centers are located in a horizontal plane intersecting the side sill-members, an end bumper structure, a stationary sub-axle lading bottom, and a longitudinally extending brace for the middle of the end bumper structure and located at least in part above the said lading bottom.

119. In a mine or similar rail car, the combination of side members, cross members for joining the side members, car axles having journals with their centers located in a horizontal plane intersecting the side members, and a stationary sub-axle lading floor extending from side member to side member in bracing relationship with the same.

120. In a mine or similar rail car, the combination of side sill-members and end sill-structures in rigid relationship and forming a rectangular traction truck frame, car axles having journals located with the horizontal plane of their centers intersecting said side sill-members, axle boxings secured to the side sill-members, and a stationary sub-axle lading bottom extending from side member to side member in bracing relationship with the same.

121. In a mine or similar rail car, the combination of straight longitudinal side sill-members, car axles having at least portions located above the lower portions of the longitudinal sill-members, a substantially horizontal stationary sub-axle lading bottom supported directly by said side members and extending from side member to side member in bracing relationship with the same, and side walls rising from and diverging above the said sill-members.

122. In a mine or similar rail car, the combination of car axles, straight longitudinal side sill-members including continuous stiffening lower portions located beneath the horizontal plane of the bottoms of the axles, transverse end bumper structures in rigid relationship with the side sill-members, and a stationary sub-axle lading bottom extending continuously from side member to side member for bracing the same.

123. In a mine or similar rail car, the combination of straight longitudinal metal side sill-members each including a lower flange extending longitudinally in a common plane, car axles having journals located in a horizontal plane intersecting the side sill-members, the bottoms of said axles being located above said common plane of the said flanges, and a stationary sub-axle lading bottom having substantially horizontal portions adjacent the edges supported directly by said flanges.

124. In a mine or similar rail car, the combination of car axles having journals, side sill-members extending above the axles and each including a continuous lower portion extending beneath the car axle journals, and a continuous and substantially rectangular stationary sub-axle lading bottom extending from end to end of the lading body and from sill-member to sill-member in bracing relationship therewith.

125. In a mine or similar rail car which is to be bodily shifted to emptying position for dumping, the combination with a traction truck frame consisting of straight longitudinal side sill-members and metal-and-wood end transverse sill-structures in rigid relationship with the side sill-members, of car axles having journals located with the horizontal plane of the journal centers intersecting the side sill-members, a stationary sub-axle lading bottom extending from sill-member to sill-member in bracing relationship therewith, the wheels and axle journals being grouped between upright transverse planes intersecting parts of the lading bottom located below the axle plane, outwardly sloping lading-retaining side walls supported by the traction truck frame, said side walls providing between them a substantially unobstructed lading space from which the lading may be discharged by bodily shifting the car to emptying position and bumper and coupling means at the end of the car.

126. In a mine or similar rail car, the combination with a traction truck frame comprising flanged steel straight longitudinal side sill-members located between the wheels and extending from end to end of the car, and transverse members for joining the side members, of axles having journals with the journal centers located in a plane intersecting the side sill-members, a stationary sub-axle lading bottom supported directly by the flanges of the sill-members, the wheels and axles being grouped between upright transverse planes intersecting parts of the lading bottom located below the axle plane, lading-retaining walls supported by the traction truck frame, and bumper and coupling means at the ends of the car.

127. In a mine or similar rail car, the combination with a traction truck frame comprising flanged longitudinal side sill-members extending straight from end to end of the car and transverse members for joining the side sill-members, of car axles having journals located in a horizontal plane intersecting the side sill-members, a stationary sub-axle lading bottom of substantially rectangular perimeter and supported directly by the flanges of the sill-members, the wheels and axle journals being grouped between upright transverse planes intersecting parts of the lading bottom located below the axle plane, lading-retaining walls supported by the traction truck frame, and bumper and coupling means at the ends of the car.

128. In a mine or similar rail car having a lading body, the combination of straight longitudinal load-supporting side sill-members extending substantially from end to end of the lading body, car axles having journals located with their centers horizontal and transverse to the length of the car, a stationary sub-axle lading bottom supported directly by the lower portions of the sill-members, and axle-supporting means located above the level of the lower face of the lading bottom and below the highest portions of the side sill-members, the wheels and axles being grouped between upright transverse planes intersecting parts of the lading bottom lying below the axle plane, and bumper and coupling means at the ends of the car.

129. In a mine or similar rail car including a lading body, the combination of at least two straight side members for supporting the lading body at least in part, wheels, car axles for supporting said side members and having journals, the centers of said journals intersecting the said side members, and a stationary floor structure composed of a plurality of transversely extending parts each engaged in bracing relationship with said two side members, the lower surfaces of said floor structure being located at least in major part below the horizontal plane of the said journals.

130. In a mine or similar rail car, the combination of at least two axles each having a pair of wheels and journals, a lading body including end closure walls and a stationary central bottom having an undersurface which is located below the horizontal plane of the tops of the journals and side lading walls projecting laterally over the wheels, a load-supporting traction truck frame of substantially rectangular cross-section in the horizontal plane and including substantially upright lower side wall-sections stiffened against warping and directly supporting and sealing the central lading bottom with the said lower portions of the side wall-section located between the wheels of each pair and extending below the horizontal plane of the centers of the journals, said side lading walls rising higher than the said lower side wall-sections and forming together with the said end closure walls a substantially rectangular top perimeter which is of greater transverse width than the transverse width of the said traction truck frame.

131. In a mine or similar rail car, the combination of at least two axles each having a pair of wheels and journals, a lading body including end closure walls and a stationary central bottom having an undersurface which is located below the horizontal plane of the tops of the journals and side lading walls, a load-supporting traction truck frame of substantially rectangular cross-section in the horizontal plane and including substantially upright lower side wall-sections stiffened against warping and directly supporting and sealing the lading bottom, with the lower portions of the side wall-sections extending below the horizontal plane of the centers of the car axle journals, said side lading walls rising higher than said lower side wall-sections and forming together with the end closure walls a perimeter of substantially rectangular horizontal cross-section.

132. In mine or similar rail cars, the combination of wheels, axles having journals, a sub-axle central lading bottom, longitudinal metal load-supporting members serving as sides of a traction truck frame, and separate integral transverse cast-metal end bumper members in secured relationship with the ends of the said longitudinal members.

133. In mine or similar rail cars, the combination of wheels, axles having journals, a sub-axle lading bottom, longitudinal metal load-supporting members serving as sides of a traction truck frame, and separate integral transverse cast-metal end bumper and haulage members secured to the ends of said longitudinal members.

134. In mine and similar rail cars, the combination of stiff load-supporting side members each comprising an upright section and a sidewise extending stiffening section, end traction structures rigid in respect of the side members, bumper and coupling means, car axles having journals which are located in a plane intersecting the upright sections of the side members, a non-rotatable lading bottom stationary with respect of the side members and supported directly by said stiffening sections and having at least its lower portions below the horizontal plane of the axle journals, and end and side lading-retaining walls.

135. In mine and similar rail cars, the combination of longitudinal metal side stiffening and supporting sill members each having a substantially upright web and a sidewise projecting bottom stiffening section, end traction structures rigid in respect of the side sill-members so as to form a traction truck frame, wheels, car axles having journals with their centers located intermediate the top and bottom of the side sill-members, and draw head and bumper and coupling members secured to the end traction structures, together with a non-rotatable central lading bottom stationary in respect of the side sill-members and supported directly by said stiffening sections with at least its lower portions located below the horizontal plane of the tops of the axle journals.

136. In mine and similar rail cars, the combination of load-supporting longitudinal side members, car axles having journals with their bottoms located in a horizontal plane intersecting the side members, car wheels located outside of at least parts of the side members, lading-retaining side walls, lading-retaining end closure walls, bumper and coupling means, a stationary central lading bottom with at least its lower portions located below the horizontal plane of the tops of the car axle journals, axle boxings located at least in part between the longitudinal side members, together with transverse axle protective coverings above the car axles.

137. In a mine or similar rail car which is to be bodily shifted to emptying position for dumping, the combination of car wheels, axles having journals, bumper and coupling means, a car lading-body structure including means for stiffening the same against endwise drooping and against yielding when the car is tilted for the discharge of the lading, said lading body providing a substantially unobstructed lading space from which the lading may be discharged by bodily shifting the car to emptying position, and a non-rotatable stationary rectangular lading floor in bracing relationship to said stiffening means and having at least substantial parts of its lowest surfaces below the horizontal plane of the tops of the axle journals.

138. In mine and similar rail cars having a wing type lading body, the combination of load-supporting longitudinal side members, car axles having journals with their bottoms located in a horizontal plane intersecting the side members, car wheels located outside of at least parts of the side members, bumper and coupling means, said body including lading-retaining side walls and lading-retaining end closure walls, and a stationary central lading bottom with at least its lower portions located below the horizontal plane of the tops of the car axle journals, and axle boxings located at least in part between the longitudinal side members.

139. In a mine or similar rail car, the combination of car wheels and axles, bumper and coupling means, load-supporting longitudinal sill members having upright walls, means for supporting the longitudinal sill members upon said axles, said axles having journals with portions located below the plane of the tops of the said upright walls of said sill members, together with a stationary and substantially horizontal lading bottom located and extending in bracing relationship between the upright walls of the sill members and supported directly by said sill-members with at least its lower portions below the horizontal plane of the tops of the car axle journals and having a substantially rectangular horizontal perimeter.

140. In mine and similar rail cars with stiff haulage transverse end bumper sill-structures and means for providing lading-retaining side walls, the combination of wheels, car axles having journals, and a stationary central lading bottom having a substantially rectangular horizontal perimeter and with at least a major portion of its lower surface located below the horizontal plane of the tops of the axle journals and also located substantially below the horizontal plane of the upper portions of said end bumper sill-structures and extending from side wall to side wall in bracing relationship therewith.

141. In a mine or similar rail car, the combination of wheels and axles having journals, a traction truck frame including end members, and straight load-supporting side members inside the wheels, the said side members being supported by the axles and having substantially upright longitudinal walls and stiffening flange-sections, bumper and draw bar means attached to the end members, and a stationary central non-rotatable lading bottom supported directly by the traction truck frame and extending from side to side thereof in bracing relationship with said side members and having at least substantial portions lower than the plane of the tops of the car axle journals and also lower than the plane of the upper portions of the upright walls of the side members.

142. In a mine or similar rail car which is to be bodily shifted to emptying position for dumping, the combination of wheels, axles having journals, a non-rotatable car bottom located with at least substantial portions of its end surfaces below the horizontal plane of the tops of the axle journals, means for providing lading-containing side walls cooperative with said car bottom to furnish a substantially unobstructed lading space from which the lading may be discharged by bodily shifting the car to emptying position and end bumper structures having upright metal bumping faces extending downward from above the horizontal plane of the centers of the axle journals to substantially the level of the lower portions of the car bottom.

143. In a dumping mine or similar rail car, the combination with two pairs of opposed wheels, car axles having journals, bumper and coupling means, a substantially rectangular traction truck frame comprising longitudinal metal side members and transverse end members for joining the side members, the horizontal plane of the centers of said journals intersecting said side members, a lading body stationary with respect to the traction truck frame and including a bottom in bracing relationship to said side members adjacent the lower portions thereof, plate metal corner bracing and stiffening members having at least portions in a substantially horizontal plane and each being in rigid relationship with both a longitudinal side member and an end transverse member, said bracing and stiffening members intersecting the upright planes of the inside of the traction truck frame.

144. In a dumping four-wheel mine or similar rail car, the combination of car axles having journals, bumper and coupling means, a substantially rectangular traction truck frame consisting of longitudinal metal side members and transverse end members for joining the side members, the horizontal plane of the centers of said journals intersecting said side members, a lading body stationary with respect to the traction truck frame, metal diagonal corner bracing and stiffening members each secured to both a longitudinal side member and a transverse end member, each said corner bracing and stiffening member crossing a part of the area enclosed by the upright planes of the inside of the traction truck frame.

145. In a mine or similar rail car, the combination of side sill-members, wheels located laterally outside said side sill-members, support means interposed between said wheels and side sill-members each including an anti-friction bearing having a substantially horizontal axis located in a plane intersecting the side sill-members and a member for providing a wearing surface for the bearing and rotatable with respect to the corresponding wheel and bearing and the side sill-members, and a stationary lading bottom located in substantial part below the tops of said bearings and supported by said side sill-members.

146. In a mine or similar rail car, the combination of side sill-members, wheels, support means interposed between said wheels and side sill-members and each including an anti-friction bearing having a substantially horizontal axis located in a plane intersecting the side sill-members and a member for providing a wearing surface for the bearing and rotatable with respect to the corresponding wheel and bearing and the side sill-members, and a stationary lading bottom located in substantial part below the tops of said bearings.

147. In a mine or similar rail car having a traction truck frame including side sill-members and connected end traction structures, one of the end traction structures including a transverse member extending from one side sill-member to the other and bearing against the ends of said side sill-members, and metal stirrups each overlapping the end of one said side sill-member and secured to said side sill-member and passing around said transverse member.

148. In a mine or similar rail car having a traction truck frame including side sills and connected end traction structures, one of the end traction structures having a cast-metal end member extending from one side sill-member to the other and securely connected to the side sill-members, said cast-metal member being provided with bumper and coupling means.

149. In mine and other cars which are to be bodily tilted to emptying position for dumping, the combination of side beams, end beams secured to the side beams so as to form a traction truck, rotary car axles penetrating the side beams and located wholly above the bottom portions of the side beams, said bottom portions of the side beams extending uninterruptedly from end to end, together with a stationary lading bottom located below the plane of the tops of the car wheel axles and including elements extending from side beam to side beam and bracing the same.

150. In mine and other cars, the combination of side beams, end beams secured to and at their inner vertical faces abutting against the ends of the side beams, rotary car axles above the bottom portions of the side beams, together with a stationary lading bottom below the plane of the tops of the car wheel axles and including elements extending from side beam to side beam and bracing the same adjacent the lower portions thereof.

151. In mine and other cars, the combination of flanged metal side beams and end beams secured together, rotary car axles above the side beam bottom flanges, together with a stationary lading bottom supported directly by the side beam bottom flanges.

152. In mine and other cars, the combination of side beams and end beams secured together, rotary car axles above the bottom portions of the side beams, a stationary lading bottom below the plane of the tops of the car wheel axles and extending from side beam to side beam adjacent the lower portions thereof for bracing the same, together with a bumper and draw-head member.

153. In mine and other cars which are to be bodily shifted to emptying position for dumping, the combination of side beams, end beams, rotary car axles above the bottom portions of the side beams, lading retaining sides and lading body end closures for providing a substantially unobstructed lading space, together with a stationary lading bottom below the plane of the tops of the car wheel axles and extending in bracing relationship from side beam to side beam.

154. In mine and similar rail cars, the combination of side beams, end beams, car axles penetrating the side beams above the plane of their bottom portions and having journals, a stationary central lading bottom lying at least in substantial part below the plane of the tops of the car axle journals, together with a flanged metal diagonal end bracing member.

155. In mine and similar rail cars, the combination of side beams, end beams, car axles penetrating the side beams above their bottom portions and having journals, a stationary central lading bottom lying at least in substantial part below the plane of the tops of the car axle journals, together with a flanged metal diagonal end bracing member including a vertical web plate for connecting an end beam to a side beam.

156. In mine and similar rail cars, the combination of side beams, an end beam, car axles penetrating the side beams below their uppermost portions and having journals, a stationary central lading bottom lying at least in substantial part below the plane of the tops of the car axle journals, together with a flanged metal diagonal end bracing member secured substantially at the center portion of the end beam and to the side beams on either side.

157. In mine and other cars, the combination of side beams, an end beam, car axles having journals, the centers of which lie in a horizontal plane cutting the side beams, a stationary central lading bottom lying at least in substantial part below the plane of the tops of the car axle journals, together with an inclined sheet metal end beam deflector plate secured to the lading bottom and extending thence up to and over the end beam and secured to the end beam.

158. In end dumping mine and similar rail cars, the combination of side beams, end beams, car axles having journals the centers of which lie in a horizontal plane cutting the side beams, a stationary lading bottom lying at least in substantial part below the plane of the tops of the car axle journals, together with an inclined sheet metal axle deflector member extending from the bottom and passing over a car axle so that the lading will be guided over the car axle when the car is tilted to the end dumping positon.

159. In end dumping mine and similar rail cars, the combination of side beams, an end beam, car axles supporting and penetrating the side beams and having journals, a stationary central lading bottom lying at least in substantial part below the plane of the tops of the car axle journals, together with inclined axle and end beam deflector plate members extending upward from the bottom and so disposed with respect to the lading bottom, the car axles and the end beam, that the lading will be guided over the said axles and end beam, when the car is tilted into the end dumping position.

160. In mine and other cars, the combination of side beams, end beams, car axles above the bottom portions of the side beams, a stationary lading bottom below the plane of the tops of the car wheel axles, together with a side beam cross member connecting and secured to the bottom portions of the side beams between the end beams.

161. In mine and other cars, the combination of side beams, end beams, rotary car axles above the bottom portions of the side beams, rotary axle journal boxings, together with a stationary lading bottom below the plane of the tops of the car wheel axles and extending in bracing relationship between lower portions of the side beams.

162. In mine and other cars, the combination of side beams, end beams, car axles above the bottom portions of the side beams, an axle tube surrounding a car wheel axle, together with a stationary lading bottom below the plane of the tops of the car wheel axles.

163. In mine and other cars, the combination of side beams, an end beam including a flanged metal beam member, rotary car axles above the bottom portions of the side beams, together with a stationary lading bottom below the plane of the tops of the car wheel axles and extending in bracing relationship between lower portions of the side beams.

164. In mine and similar rail cars, the combination of side beams, a box girder end beam, car axles whose centers lie in a horizontal plane cutting the side beams, together with a stationary central lading bottom lying at least in substantial part below the plane of the tops of the car axle journals.

165. In mine and similar rail cars, the combination of side beams, a box girder end beam including a flanged metal beam member having a horizontal web plate, car axles with journals whose centers lie in a horizontal plane cutting the side beams, together with a stationary central lading bottom located at least in substantial part below the plane of the tops of the car axle journals.

166. In mine and similar rail cars, the combination of side beams, box girder end beams including flanged metal beam members and facing plates secured together by their edge portions, said side beams and end beams being secured together to form a traction truck frame, car axles having journals whose centers lie in a horizontal plane cutting the side beams, together with a stationary central lading bottom located at least in substantial part below the plane of the tops of the car axle journals.

167. In mine and similar rail cars, the combination of side beams, a box girder end beam including two vertical and two horizontal members secured together by their edge portions, car axles having journals whose centers lie in a horizontal plane cutting the side beams, together with a stationary central lading bottom located at least in substantial part below the plane of the tops of the car axle journals.

168. In mine and other cars, the combination of side beams, box girder end beams secured to and at their inner vertical faces abutting against the ends of the side beams, rotary car axles above the bottom portions of the side beams, together with a stationary lading bottom below the plane of the tops of the car wheel axles.

169. In mine and similar rail cars, the combination of side beams, car axles having journals whose centers are located in a horizontal plane cutting the side beams, together with spaced apart stationary lading bottoms located at least in substantial part below the plane of the tops of the car axle journals and extending from side beam to side beam in bracing relationship therewith.

170. In mine and similar rail cars, the combination of side beams, car axles having journals whose centers are located in a horizontal plane cutting the side beams, together with a stationary central lading bottom comprising a plurality of spaced portions located at least in substantial part below the plane of the tops of the car axle journals and each extending continuously and approximately horizontally from side beam to side beam in bracing relationship therewith.

171. In mine and other cars, the combination of side beams, a rotary car axle above the bottom portion of the side beams, together with spaced apart stationary lading bottoms below the plane of the tops of the car wheel axles and supported by and in bracing relationship with the bottom portions of the side beams.

172. In mine and similar rail cars, the combination of side beams, an end beam including a flanged metal beam member having a horizontal web plate, car axles having journals whose centers lie in a horizontal plane cutting the side beams, together with a stationary central lading bottom lying at least in substantial part below the plane of the tops of the car axle journals.

173. In mine and other cars, the combination of side beams, an end beam including a drawhead aperture, rotary car axles above the bottom portions of the side beams, together with a stationary lading bottom below the plane of the tops of the car wheel axles and extending from side beam to side beam in bracing relationship therewith.

174. In mine and similar rail cars, the combination of side beams, an end beam including a center draw-head aperture, car axles having journals whose centers lie in a horizontal plane cutting the side beams, together with a stationary central lading bottom lying at least in substantial part below the plane of the tops of the car axle journals and extending from side beam to side beam in bracing relationship therewith.

175. In mine and other cars, the combination of side beams, an end structure, a draw-head, rotary car wheel axles above the bottom portions of the side beams, together with a stationary lading bottom below the plane of the tops of the car wheel axles and extending from side beam to side beam in bracing relationship therewith.

176. In mine and other cars, the combination of side beams, end beams, rotary axle journal boxings located on the side beams, rotary car wheel axles in the boxings, a horizontal plane through the boxings and axles intersecting the side beams together with a stationary lading bottom below the plane of the tops of the car wheel axles and extending from side beam to side beam in bracing relationship therewith.

177. In mine and other cars, the combination of side beams, end beams, rotary axle journal boxings secured to the side beams by means of vertical attaching faces, rotary car wheel axles in the boxings and above the bottom portions of the side beams, together with a stationary lading bottom below the plane of the tops of the car wheel axles and extending from side beam to side beam in bracing relationship therewith.

178. In mine and other cars, the combination of car wheels, side beams between the car wheels, end beams, rotary car wheel axles above the bottom portions of the side beams, together with a stationary lading bottom below the plane of the tops of the car wheel axles and extending from side beam to side beam in bracing relationship therewith.

179. In mine and other cars, the combination of car wheels, side beams between the car wheels, end beams, rotary axle journal boxings secured to the side beams, rotary car wheel axles in the wheels and in the boxings and above the bottom portions of the side beams, together with a stationary lading bottom below the plane of the tops of the car wheel axles and extending from side beam to side beam in bracing relationship therewith.

180. In mine and other cars, the combination of side beams, an end beam secured to the side beams so as to form a traction truck and including a bumper member, rotary car axles penetrating the side beams and located wholly above the bottom portions of the side beams, said bottom portions of the side beams extending uninterruptedly from end to end, together with a stationary lading bottom located below the plane of the tops of the car wheel axles and including elements extending from side beam to side beam and bracing the same.

181. In mine and other cars, the combination of a side beam including a continuous bottom flange, a car wheel rotary axle above the said bottom flange of said side beam, together with a stationary lading bottom below a horizontal plane passing through the top of the said rotary car axle and supported directly by said flange.

182. In mine and similar rail cars, the combination of axles having journals, a side beam including a continuous bottom flange under one of the axles, said axle penetrating and supporting the said beam, together with a stationary central lading bottom lying at least in substantial part below the horizontal plane of the tops of the journals of the said axles and supported directly by said flange.

183. In mine and other cars, the combination of a side beam including a continuous bottom flange from end to end of said side beam, a car wheel rotary axle above said bottom flange, together with a stationary lading bottom the major portion of which is below a horizontal plane passing through the top of the said car axle and supported directly by said flange.

184. In mine and other cars, the combination of a longitudinal beam, car axles above the bottom portions of the longitudinal beam, together with spaced apart lading bottoms below the plane of the tops of the car axles and supported directly by the bottom portion of the longitudinal beam and in bracing relationship therewith.

185. In mine and other cars, the combination of longitudinal beams having longitudinal bottom flanges, car axles above the bottom flanges of the longitudinal beams, together with spaced apart lading bottoms supported directly by said flanges.

186. In a transverse end sill structure for the traction truck frame of a mine or similar rail car, a plurality of parallel laminations of wood joined at substantially transverse surfaces, metal members having walls parallel to said laminations, and bumper means secured to said walls and laminations and spaced from the sides of said frame so that said laminations and walls provide a cushioned end structure.

187. In a yielding transverse end sill structure for the traction truck frame of a mine or similar rail car, a plurality of resilient members to provide bumper springs extending from side to side of the truck frame, and bumper means attached to said members adjacent the center thereof and spaced from the sides of the truck frame.

188. In a mine or similar rail car, the combination with car axles having journals, of a rectangular traction truck frame having structural metal side members for stiffening the car against end drooping, and a cast-metal bumper member extending the full width of the frame and connected to said side members, and a lading bottom located at least in substantial part below the horizontal plane of the tops of the car axle journals and extending from side member to side member of the traction truck frame and bracing said side members.

189. In a mine or similar rail car, a traction truck frame including structural steel side members, and a cast-metal member connected to said side members for forming one end of said frame and including integral bumper means, and a lading bottom located at least in substantial part below the horizontal plane of the tops of the car axle journals and extending from side member to side member of the traction truck frame and bracing said side members.

190. In a traction truck frame for a mine or similar rail car, the combination of car axles having journals, and a lading bottom located at least in substantial part below the horizontal plane of the tops of the car axle journals, of a transverse end sill structure having a bumper means including cushioning means composed of laminated wood.

191. In a traction truck frame for a mine or similar rail car, the combination with car axles having journals, and a lading bottom located at least in substantial part below the horizontal plane of the tops of the car axle journals, of a transverse end sill structure having a bumper means and transverse bumper springs.

192. In a traction truck frame for a mine or similar rail car, the combination with car axles having journals, and a lading bottom located at least in substantial part below the horizontal plane of the tops of the car axle journals, of a transverse end sill structure having a bumper means and cushioning springs therefor and extending above and below said plane.

193. In a mine or similar rail car, the combination with car axles having journals and a lading bottom located at least in substantial part below the horizontal plane of the tops of the car axle journals, of a rectangular traction truck frame supported on said axles and itself supporting said bottom, and including structural steel side members and a cast-metal end member passing from side member to side member and secured thereto, said bottom being in a bracing relationship to said side members.

194. In a mine or similar rail car, the combination with car axles having journals, and a lading bottom located at least in substantial part below the horizontal plane of the tops of the car axle journals, of a traction truck frame having an integral cast-metal member forming one end of the said frame and having its major portion located above and longitudinally offset from said bottom.

195. In mine and other cars, the combination of a traction truck embodying side sills and box girder end sills fixed to the side sills and receiving the haulage strains and transmitting the same to said side sills, a lading floor, car wheels, and axles extending through the side sills above their bottom portions and above the general level of said floor.

196. In mine and other cars, the combination of relatively deep structural metal side sills whereby the said side sills may also act as the lower lading retaining side walls, box girder end sills secured to the side sills so as to form a traction truck, a stationary lading bottom secured to the lower portions of the side sills, together with wheeled rotary car axles intermediate the upper and lower edge portions of the side sills and above the lading bottom.

197. In mine and other cars, the combination of structural metal side sills and box girder end sills secured together in the form of a traction truck, a stationary lading bottom secured to the bottom portions of the side sills, together with an end sill bracing member extending diagonally to the side sills on either side and secured thereto.

198. In a mine or similar rail car, the combination with side sills and a box girder end sill including at least two transverse members spaced lengthwise of the car, of V-shaped bracing means connected to the side sills and extending diagonally from each side sill toward the longitudinal center axis of the car and connected to one said transverse member adjacent said axis.

199. In mine and similar rail cars, the combination of side sill members, an end sill member extending across the adjacent ends of the side sill members, stirrups extending across the end sill member and over the side sill members and secured to said side sill members, and bumper means extending across the outer faces of the stirrups and the outer faces of the end sill member.

200. In mine and similar rail cars, the combination of side sill members, an end sill member extending across the adjacent ends of the side sill members, stirrups extending across the end sill member and over the side sill members and secured to said side sill members, bumper means extending across the outer faces of the stirrups and the outer faces of the end sill member, and rivets engaging said bumper means and stirrups and end sill member.

201. In mine and similar rail cars, the combination of side sill members, an end sill member extending across the adjacent ends of the side sill members, stirrups extending across the end sill member and over the side sill members and secured to said side sill members, bumper means extending across the outer faces of the stirrups and the outer faces of the end sill member, and transverse rivets engaging said bumper means and said stirrups and said end sill member.

202. In a mine or similar rail car, the combination with a traction truck frame comprising straight longitudinal side sill-members with the lower portions thereof extending uninterruptedly past the axles, and also comprising transverse end members joining said side sill-members, of wheels and car axles including journals located entirely above said uninterrupted portions of the side sill-members, and a stationary sub-axle lading bottom comprised of a plurality of substantially horizontal members each extending between and supported directly by the side sill-members, the wheels and axles being grouped between transverse upright planes intersecting parts of the bottom located below said axle plane.

203. In a mine or similar rail car, the combination with a traction truck frame comprising straight longitudinal side sill-members with uninterrupted lower portions and also comprising transverse members for joining the side sill-members, of wheels, car axles penetrating through apertures of the side sill-members and having journals, and a stationary central substantially horizontal sub-axle lading bottom supported directly by said side sill-members, said journals being located entirely above the said central lading bottom.

204. In mine and other cars, the combination of side beams having uninterrupted bottom portions and axle apertures above said bottom portions, end beams, said side and end beams being secured together in the form of a traction truck, car axles extending through said apertures, a stationary lading bottom below the plane of the tops of the car axles, together with overhanging lading retaining sides, and lading body end closures supported by the traction truck and so constructed and arranged that the traction truck forms the lower portion of the lading retaining body, said sides, end closures and traction truck providing a substantially unobstructed lading space from which the lading may be discharged by shifting the car to emptying position.

205. In mine and other cars, the combination of side beams having uninterrupted bottom portions and axle apertures above said bottom portions, end beams, car axles extending through said apertures, a stationary lading bottom below the plane of the tops of the car axles, together with overhanging lading retaining sides, and lading body end closures for providing a substantially unobstructed lading space from which the lading may be discharged by shifting the car to emptying position.

206. In a mine or similar rail car, the combination of side members, axle bearings secured to said side members, axles in said bearings, axle coverings extending over the axles and in secured relationship with the axle bearings for supporting said coverings and to adapt said coverings to serve as bracing members between said side members, and a stationary sub-axle floor located between the side members and also operating as a bracing structure therefor.

207. In a mine or similar rail car, the combination of side members, car axle members in supporting relationship to the side members and including journals located in a horizontal plane intersecting the side members, and a lading bottom at least part of which is comprised of a sub-axle portion extending in a substantially horizontal direction from side member to side member and engaging the same to be supported thereby and to operate as a bracing means for said side members.

208. In a mine or similar rail car, the combination of side beams, car axles located in a horizontal plane intersecting said side beams and in supporting relationship thereto, stationary sub-axle lading bottom portions supported directly by the lower portions of the side beams and bracing the same and spaced longitudinally apart opposite the axles, and means for covering the spaces between said bottom portions and extending between the side beams for bracing the same.

209. In a mine or similar rail car, the combination of car sides each having a horizontal lower portion of large mass and cross-section and stability relative to other parts of said side and operating as a longitudinal load-supporting reinforcing member for said side and extending continuously past the axles, axle boxings supported by said reinforcing members, car axles in said axle boxings and having journals with the horizontal plane of the journals intersecting the said car sides, and a stationary sub-axle lading-supporting floor supported directly by said lower portions and cooperating with and bracing the same.

AUDLEY HART STOW.

DISCLAIMER 1,961,016.—*Audley Hart Stow*, Maybeury, W. Va. MINE CAR. Patent dated May 29, 1934. Disclaimer filed May 25, 1942, by the assignee, *Sanford Investment Company*.

Hereby enters this disclaimer to claims 22, 23, 24, 25, 31, 33, 34, 35, 36, 37, 38, 39, 45, 46, 48, 51, 52, 56, 59, 61, 62, 63, 64, 65, 66, 67, 68, 69, 70, 71, 72, 73, 74, 75, 76, 77, 78, 79, 83, 84, 85, 86, 87, 88, 91, 92, 97, 100, 104, 105, 106, 107, 108, 112, 114, 115, 116, 117, 119, 120, 121, 122, 123, 124, 125, 126, 127, 128, 129, 130, 131, 132, 133, 134, 135, 136, 137, 138, 139, 140, 141, 142, 143, 145, 146, 148, 149, 150, 151, 152, 153, 160, 161, 162, 163, 164, 165, 166, 167, 168, 169, 171, 172, 173, 174, 175, 176, 177, 178, 179, 180, 181, 182, 183, 184, 188, 189, 191, 193, 194, 195, 196, 198, 200, 201, 202, 203, 204, 205, 207, and 209, of said specification.

[*Official Gazette June 16, 1942.*]

DISCLAIMER 1,961,016.—*Audley Hart Stow*, Maybeury, W. Va. MINE CAR. Patent dated May 29, 1934. Disclaimer filed December 8, 1942, by the assignee, *Sanford Investment Company*.

Hereby enters this disclaimer to claims 8, 15, 20, 21, 80, 81, 82, 89, 90, 95, 96, 98, 157, 158, 159, and 192 of said specification.

[*Official Gazette January 5, 1943.*]

lading may be discharged by shifting the car to emptying position.

206. In a mine or similar rail car, the combination of side members, axle bearings secured to said side members, axles in said bearings, axle coverings extending over the axles and in secured relationship with the axle bearings for supporting said coverings and to adapt said coverings to serve as bracing members between said side members, and a stationary sub-axle floor located between the side members and also operating as a bracing structure therefor.

207. In a mine or similar rail car, the combination of side members, car axle members in supporting relationship to the side members and including journals located in a horizontal plane intersecting the side members, and a lading bottom at least part of which is comprised of a sub-axle portion extending in a substantially horizontal direction from side member to side member and engaging the same to be supported thereby and to operate as a bracing means for said side members.

208. In a mine or similar rail car, the combination of side beams, car axles located in a horizontal plane intersecting said side beams and in supporting relationship thereto, stationary sub-axle lading bottom portions supported directly by the lower portions of the side beams and bracing the same and spaced longitudinally apart opposite the axles, and means for covering the spaces between said bottom portions and extending between the side beams for bracing the same.

209. In a mine or similar rail car, the combination of car sides each having a horizontal lower portion of large mass and cross-section and stability relative to other parts of said side and operating as a longitudinal load-supporting reinforcing member for said side and extending continuously past the axles, axle boxings supported by said reinforcing members, car axles in said axle boxings and having journals with the horizontal plane of the journals intersecting the said car sides, and a stationary sub-axle lading-supporting floor supported directly by said lower portions and cooperating with and bracing the same.

AUDLEY HART STOW.

DISCLAIMER 1,961,016.—*Audley Hart Stow*, Maybeury, W. Va. MINE CAR. Patent dated May 29, 1934. Disclaimer filed May 25, 1942, by the assignee, *Sanford Investment Company*.

Hereby enters this disclaimer to claims 22, 23, 24, 25, 31, 33, 34, 35, 36, 37, 38, 39, 45, 46, 48, 51, 52, 56, 59, 61, 62, 63, 64, 65, 66, 67, 68, 69, 70, 71, 72, 73, 74, 75, 76, 77, 78, 79, 83, 84, 85, 86, 87, 88, 91, 92, 97, 100, 104, 105, 106, 107, 108, 112, 114, 115, 116, 117, 119, 120, 121, 122, 123, 124, 125, 126, 127, 128, 129, 130, 131, 132, 133, 134, 135, 136, 137, 138, 139, 140, 141, 142, 143, 145, 146, 148, 149, 150, 151, 152, 153, 160, 161, 162, 163, 164, 165, 166, 167, 168, 169, 171, 172, 173, 174, 175, 176, 177, 178, 179, 180, 181, 182, 183, 184, 188, 189, 191, 193, 194, 195, 196, 198, 200, 201, 202, 203, 204, 205, 207, and 209, of said specification.

[*Official Gazette June 16, 1942.*]

DISCLAIMER 1,961,016.—*Audley Hart Stow*, Maybeury, W. Va. MINE CAR. Patent dated May 29, 1934. Disclaimer filed December 8, 1942, by the assignee, *Sanford Investment Company*.

Hereby enters this disclaimer to claims 8, 15, 20, 21, 80, 81, 82, 89, 90, 95, 96, 98, 157, 158, 159, and 192 of said specification.

[*Official Gazette January 5, 1943.*]